United States Patent
Nishimura et al.

(10) Patent No.: US 12,160,077 B2
(45) Date of Patent: Dec. 3, 2024

(54) ACTIVE ELEMENT ADDED-OPTICAL FIBER, RESONATOR, AND FIBER LASER DEVICE

(71) Applicant: Fujikura Ltd., Tokyo (JP)

(72) Inventors: Ryoichi Nishimura, Chiba (JP); Rintaro Kitahara, Chiba (JP)

(73) Assignee: Fujikura Ltd., Tokyo (JP)

( * ) Notice: Subject to any disclaimer, the term of this patent is extended or adjusted under 35 U.S.C. 154(b) by 679 days.

(21) Appl. No.: 17/433,182

(22) PCT Filed: Mar. 27, 2020

(86) PCT No.: PCT/JP2020/014389
§ 371 (c)(1),
(2) Date: Aug. 23, 2021

(87) PCT Pub. No.: WO2020/203930
PCT Pub. Date: Oct. 8, 2020

(65) Prior Publication Data
US 2022/0190543 A1 Jun. 16, 2022

(30) Foreign Application Priority Data

Mar. 29, 2019 (JP) .................. 2019-065620
Sep. 25, 2019 (JP) .................. 2019-174772
Mar. 27, 2020 (JP) .................. 2020-058028

(51) Int. Cl.
*H01S 3/30* (2006.01)
*H01S 3/067* (2006.01)
(Continued)

(52) U.S. Cl.
CPC ........ *H01S 3/0672* (2013.01); *H01S 3/06716* (2013.01); *H01S 3/06733* (2013.01);
(Continued)

(58) Field of Classification Search
CPC ............... H01S 3/0672; H01S 3/06716; H01S 3/06733; H01S 3/1691; H01S 3/0675; H01S 3/094053
See application file for complete search history.

(56) References Cited

U.S. PATENT DOCUMENTS 5,799,125 A 8/1998 Inagaki et al.
9,291,768 B2 * 3/2016 Ishida ................ G02B 6/02042
(Continued)

FOREIGN PATENT DOCUMENTS

CN 103257394 A 8/2013
JP H03-127032 A 5/1991
(Continued)

OTHER PUBLICATIONS

International Search Report issued in corresponding International Patent Application No. PCT/JP2020/014389 dated Jun. 23, 2020 (3 pages).

*Primary Examiner* — Kinam Park
(74) *Attorney, Agent, or Firm* — Osha Bergman Watanabe & Burton LLP

(57) ABSTRACT

An active element-doped optical fiber includes: a core that includes first and second regions. The first region ranges from a central axis to a predetermined radius, and is doped with an active element excited by excitation light. The second region surrounds the first region with no gap, extends to an outer peripheral surface of the core, and is not doped with the active element. The core satisfies 0.1 d<ra<d, where ra is a radius of the first region and d is a radius of the core. The core has, in a region of 0.2 d<r≤0.9 d, a maximum value position at which a refractive index becomes maximum, where r is a distance from a central axis of the core in a radial direction.

24 Claims, 10 Drawing Sheets

(51) Int. Cl.
*H01S 3/16* (2006.01)
*H01S 3/094* (2006.01)

(52) U.S. Cl.
CPC .......... *H01S 3/1691* (2013.01); *H01S 3/0675* (2013.01); *H01S 3/094053* (2013.01)

(56) References Cited

U.S. PATENT DOCUMENTS

| | | |
|---|---|---|
| 2002/0018630 A1 | 2/2002 | Richardson et al. |
| 2004/0005127 A1* | 1/2004 | Kliner ............... C03B 37/01274 |
| | | 385/114 |
| 2008/0025363 A1 | 1/2008 | Yla-Jarkko et al. |
| 2008/0069508 A1* | 3/2008 | Dong ...................... C03C 3/097 |
| | | 385/127 |
| 2009/0154888 A1* | 6/2009 | Abbott, III ........... G02B 6/0365 |
| | | 385/124 |
| 2011/0280584 A1* | 11/2011 | Tankala ............. G02B 6/03694 |
| | | 398/141 |
| 2014/0036348 A1 | 2/2014 | Bennett et al. |
| 2016/0043525 A1* | 2/2016 | Ichige ................... H01S 3/0675 |
| | | 359/341.1 |
| 2016/0116660 A1* | 4/2016 | Benjamin .......... G02B 6/02395 |
| | | 362/555 |
| 2021/0026064 A1* | 1/2021 | Kawasaki ........... C03B 37/0253 |
| 2022/0094131 A1* | 3/2022 | Kitahara ............... H01S 3/0672 |

FOREIGN PATENT DOCUMENTS

| | | |
|---|---|---|
| JP | 2006-058912 A | 3/2006 |
| JP | 2012-162433 A | 8/2012 |
| JP | 5124701 B1 | 1/2013 |
| JP | 2014-122159 A | 7/2014 |
| JP | 2014-179404 A | 9/2014 |
| JP | 2018-060935 A | 4/2018 |
| WO | 2014/142010 A1 | 9/2014 |

\* cited by examiner

ACTIVE ELEMENT ADDED-OPTICAL FIBER, RESONATOR, AND FIBER LASER DEVICE

BACKGROUND

Technical Field

The present invention relates to an active element-added optical fiber, a resonator, and a fiber laser device capable of suppressing deterioration of beam quality.

Description of Related Art

A fiber laser device, which is excellent in light condensing property, has high power density, and can obtain light that becomes a small beam spot, is used in various fields such as a laser processing field and a medical field. In such a fiber laser device, output of emitted light is increased. However, when the power density of light in an optical fiber increases, wavelength conversion of light due to stimulated Raman scattering is likely to occur, and light having an unintended wavelength can be emitted. In this case, the light reflected by a workpiece or the like returns to the fiber laser device and is amplified, and the amplification of the light having the wavelength to be amplified in design becomes unstable, and the output can become unstable.

Means for suppressing stimulated Raman scattering in the optical fiber include increasing the effective cross-sectional area of light propagating through the core. One method for increasing the effective cross-sectional area is to increase the diameter of the core. Therefore, in order to suppress stimulated Raman scattering in the optical fiber, for example, an optical fiber having a core that enables propagation of light in a few mode is used.

In the fiber laser device, the beam quality of emitted light is excellent from the viewpoint of light condensing property or the like. Therefore, there is a demand for suppressing excitation of light in modes other than the basic mode even when the effective cross-sectional area of light is increased by using an optical fiber having a core that enables propagation of light in the few mode as described above. Note that the beam quality is indicated, for example, by $M^2$ (M square) or the like. Therefore, amplification of light in a higher mode is suppressed while using an active element-added optical fiber having a core that enables propagation of light in the few mode as in an active element-added optical fiber described in Patent Literature 1 below.

[Patent Literature 1] JP Japanese Patent No. 5124701 B1

SUMMARY

However, there is a demand for an active element-added optical fiber capable of further suppressing deterioration of beam quality. Therefore, one or more embodiments of the present invention provide an active element-added optical fiber, a resonator, and a fiber laser device capable of suppressing deterioration of beam quality.

One or more embodiments of the present invention provide an active element-added (or element-doped) optical fiber including a core, in which the core includes a first region and a second region, the first region ranges from a central axis to a predetermined radius (i.e., ra), and is doped with and an active element pumped (or excited) by pumping light (or excitation light), the second region surrounds the first region with no gap, extends to an outer peripheral surface of the core, and is not doped with the active element, when ra is a radius of the first region and d is a radius of the core, the core satisfies $0.1\, d < ra < d$, and when r is a distance from a central axis of the core in a radial direction, the core has, in a region of $0.2\, d < r \leq 0.9\, d$, at least one maximum value position at which a refractive index is (or becomes) maximum at a refractive index higher than an average value of a refractive index in a region of $0 \leq r \leq 0.9\, d$.

The inventor has found the following regarding the active element-added optical fiber. That is, by adding the active element to the first region in the above range and not adding the active element to the second region in the above range, while LP01 mode light propagating through the core is amplified, the amplification of light in a higher mode can be suppressed. On the other hand, in the region of $0.2\, d < r \leq 0.9\, d$, when at least one maximum value position where the refractive index becomes the maximum at a refractive index higher than the average value of the refractive index in the region of $0 \leq r \leq 0.9\, d$ exists, it is possible to suppress the LP01 mode light from being excessively concentrated in the vicinity of the central axis and to increase the effective cross-sectional area of the LP01 mode light. Therefore, occurrence of stimulated Raman scattering can be suppressed. Therefore, with the active element-added optical fiber of one or more embodiments of the present invention, deterioration of beam quality can be suppressed.

Further, the average value of the concentration of the active element in the region of $0 \leq r \leq 0.1\, d$ may be higher than the average value of the concentration of the active element in the region of $0.1\, d < r \leq ra$.

In this case, the LP01 mode light propagating through the core can be further amplified.

The average value of the refractive index in the region of $0.1\, d \leq r \leq 0.8\, ra$ may be higher than the average value of the refractive index in the region of $1.1\, ra \leq r \leq 0.9\, d$.

In this case, by increasing the maximum value of the refractive index in the range of $0.2\, d < r < 0.9\, d$, the effective cross-sectional area of light propagating through the core can be further increased.

Further, the average value of the refractive index in the region of $0.1\, d \leq r \leq 0.8\, ra$ may be lower than the average value of the refractive index in the region of $1.1\, ra \leq r \leq 0.9\, d$.

In this case, by increasing the maximum value of the refractive index in the range of $r < 0.1\, d$, the effective cross-sectional area of light propagating through the core can be reduced.

Further, the average value of the refractive index in the region of $0.1\, d \leq r \leq 0.8\, ra$ may be equal to the average value of the refractive index in the region of $1.1\, ra \leq r \leq 0.9\, d$.

Note that the average value of the refractive index in the region of $0.1\, d \leq r \leq 0.8\, ra$ being equal to the average value of the refractive index in the region of $1.1\, ra \leq r \leq 0.9\, d$ means that the difference between the average value of the refractive index in the region of $0.1\, d \leq r \leq 0.8\, ra$ and the average value of the refractive index in the region of $1.1\, ra \leq r \leq 0.9\, d$ is −0.0077% or more and 0.0089% or less. In this case, when the effect that the maximum value of the refractive index in the range of $r < 0.1\, d$ reduces the effective cross-sectional area is equivalent to the effect that the maximum value of the refractive index in the range of $0.2\, d < r < 0.9\, d$ increases the effective cross-sectional area, the optical fiber according to one or more embodiments of the present invention and the optical fiber having a rectangular refractive index profile can be connected while suppressing the optical loss.

Further, the core satisfies $ra \leq 0.75\, d$ in one or more embodiments.

In this case, as compared with the case of $ra > 0.75\, d$, the amplification of the light in a higher mode propagating through the core can be remarkably suppressed, and the deterioration of the beam quality can be more remarkably suppressed.

Further, the core satisfies ra≤0.7 d in one or more embodiments.

In this case, as compared with the case of 0.7 d<ra≤0.75 d, the amplification of the light in a higher mode propagating through the core can be remarkably suppressed, and the deterioration of the beam quality can be more remarkably suppressed.

Further, the core satisfies ra<0.7 d in one or more embodiments.

In this case, as compared with the case of ra≥0.7 d, the amplification of the light in a higher mode propagating through the core can be remarkably suppressed, and the deterioration of the beam quality can be more remarkably suppressed.

Further, the core satisfies 0.4 d<ra in one or more embodiments.

In this case, the efficiency of amplification of light can be further increased as compared with the case of ra≤0.4 d.

Moreover, the core satisfies 0.5 d<ra in one or more embodiments.

In this case, the efficiency of amplification of light can be further increased. Further, the basic mode can be efficiently amplified while the amplification of the higher mode is suppressed.

Further, the average value of the refractive index in the region of 0≤r≤0.1 d may be higher than the refractive index in the region of r=0.2 d.

In this case, the efficiency of amplification of the LP01 mode light can be further increased.

Further, the active element may include ytterbium.

Further, when the active element is ytterbium, the core has at least one maximum value position in the region of 0.338 d<r≤0.614 d.

In this case, it is possible to efficiently amplify the LP01 mode light by further suppressing the LP01 mode light from being excessively concentrated on the center of the core and suppressing the amount of protrusion of the LP01 mode light from the first region. Further, the maximum value position existing in such a range makes it possible to effectively widen the effective cross-sectional area of the LP01 mode light in the active element-added optical fiber, suppress the occurrence of stimulated Raman scattering, and suppress deterioration of beam quality.

Further, when the active element is ytterbium, the core satisfies 0.595 d≤ra≤0.716 d in one or more embodiments.

By setting the first region of the core within such a range, it is possible to effectively widen the effective cross-sectional area of the LP01 mode light in the active element-added optical fiber, suppress the occurrence of stimulated Raman scattering, and suppress deterioration of beam quality.

Further, the core has a region of 1.1 ra<r≤0.9 d in which the standard deviation of the relative refractive index difference may be equal to or less than 0.004.

The refractive index on the outer peripheral side of the core easily influences the distribution of the power of the light propagating through the core. Therefore, with such a configuration, it is possible to suppress unintentional disturbance of the power of the light. Therefore, a reduction in beam quality can be further suppressed.

In this case, at least the region of 1.1 ra<r≤0.9 d may be made of quartz to or with which only germanium is added or doped.

When the region of 1.1 ra<r≤d is made of quartz to which only germanium is added, the standard deviation of the relative refractive index difference of the region of 1.1 ra<r≤0.9 d can be easily set to 0.01 or less.

Further, the maximum value position may locate in the first region, at least a part of the first region may be further doped with an up-dopant that increases the refractive index of the core, and the concentration of the up-dopant may be or become maximum at the maximum value position.

With such a configuration, the maximum value position can be formed in the first region.

Further, the maximum value position may locate in the first region, at least a part of the first region may be further doped with a down-dopant that reduces the refractive index of the core, and the concentration of the down-dopant may be or become minimum at the maximum value position.

With such a configuration, the maximum value position can be formed in the first region.

Alternatively, the maximum value position may locate in the first region, at least a part of the first region may be further doped with an up-dopant that increases the refractive index of the core and a down-dopant that reduces the refractive index of the core, and a concentration difference between the up-dopant and the down-dopant may be or become maximum at the maximum value position.

With such a configuration, the maximum value position can be formed in the first region.

Further, the active element-added optical fiber may further include: a cladding that surrounds an outer peripheral surface of the core with no gap, in which an average value of a relative refractive index difference with respect to the cladding in a region of 0≤r≤0.1 d in the core is equal to or less than a value of a relative refractive index difference at the maximum value position, an average value of a relative refractive index difference of the core with respect to the cladding is equal to or more than 0.10%, and the maximum value position may be at the distance of 0.45 d or more.

Note that a plurality of maximum value positions may exist. Here, "equal to or less than a value of a relative refractive index difference at the maximum value position" when a plurality of maximum value positions exists means equal to or less than the value of the relative refractive index difference at the maximum value position corresponding to the value of the largest relative refractive index difference among the plurality of maximum value positions. Further, when the optical fiber includes an inner cladding surrounding the core without a gap and an outer cladding surrounding the inner cladding without a gap, the inner cladding may be simply referred to as a cladding.

By forming the active element-added optical fiber in this manner, for example, the effective cross-sectional area can be increased.

Alternatively, the active element-added optical fiber may further include: a cladding that surrounds an outer peripheral surface of the core with no gap, in which an average value of a relative refractive index difference with respect to the cladding in a region of 0.055 d≤r≤0.1 d in the core is equal to or more than a value of a relative refractive index difference at the maximum value position, an average value of a relative refractive index difference of the core with respect to the cladding is larger than 0% and equal to or less than 0.18%, and the maximum value position may be at the distance of 0.55 d or less.

Note that, also in this case, a plurality of maximum value positions may exist. Here, "equal to or more than a value of a relative refractive index difference at the maximum value position" when a plurality of maximum value positions exists means equal to or more than the value of the relative refractive index difference at the maximum value position corresponding to the value of the largest relative refractive index difference among the plurality of maximum value positions.

By forming the active element-added optical fiber in this manner, for example, the effective cross-sectional area can be increased.

Further, the core may have a refractive index profile in which the refractive index gradually decreases from the maximum value position toward at least an inner side of the core.

In such a refractive index profile, for example, as compared with a rectangular refractive index profile or a refractive index profile in which the refractive index protrudes in a shape in which the maximum value position and the vicinity thereof are convex upward with respect to the rectangular refractive index profile, the vicinity of the end portion in the refractive index profile in the vicinity of the maximum value position is more likely to be away from the central axis of the core. As described above, the vicinity of the end portion of the refractive index profile in the vicinity of the maximum value position is away from the central axis of the core, so that the LP01 mode light can be further suppressed from being excessively concentrated in the vicinity of the central axis of the core, and the effective cross-sectional area of the LP01 mode light can be further increased. Therefore, the occurrence of stimulated Raman scattering can be suppressed, deterioration of beam quality can be suppressed, and light can be amplified.

Further, a resonator of one or more embodiments of the present invention includes: any of the active element-added optical fibers described above; a first mirror that is optically coupled to the core of the active element-added optical fiber on one side of the active element-added optical fiber and reflects light having at least a part of wavelength of light emitted by the pumped active element; and a second mirror that is optically coupled to the core of the active element-added optical fiber on another side of the active element-added optical fiber and reflects light having at least a part of wavelength of the light reflected by the first mirror at a reflectance lower than that of the first mirror.

With this resonator, amplification of light in a higher mode is suppressed while amplifying the LP01 mode light in light traveling between the first mirror and the second mirror. Therefore, light in which deterioration of beam quality is suppressed can be emitted.

Further, a fiber laser device according to one or more embodiments of the present invention includes any one of the active element-added optical fibers described above and a light source that emits light for pumping the active element.

As described above, in this active element-added optical fiber, deterioration of beam quality is suppressed and light can be amplified, and thus, with this fiber laser device, light in which deterioration of beam quality is suppressed can be emitted.

As described above, according to one or more embodiments of the present invention, there are provided an active element-added optical fiber, a resonator, and a fiber laser device capable of suppressing deterioration of beam quality.

DETAILED DESCRIPTION

Figure 1:
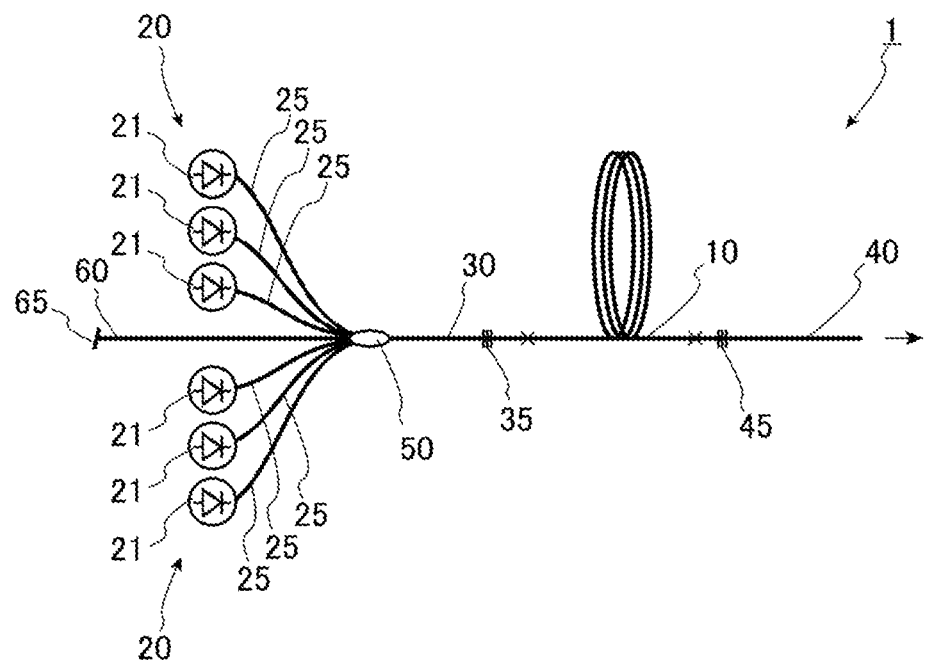
FIG. 1 is a diagram illustrating a fiber laser device according to one or more embodiments of the present invention.

Embodiments of an optical fiber and a laser device will be described below in detail with reference to the drawings. The embodiments illustrated below are for facilitating the understanding of the present invention, and are not for limiting the interpretation of the present invention. One or more embodiments of the present invention can be changed or modified without departing from the spirit. Note that, for easy understanding, scales in the drawings can be different from scales described in the description below. Further, in the following, a portion described using a refractive index may be described using a relative refractive index difference, and a portion described using a relative refractive index difference may be described using a refractive index difference.

FIG. 1 is a diagram illustrating a laser device according to one or more embodiments. As illustrated in FIG. 1, a fiber laser device 1 according to one or more embodiments is a resonator-type fiber laser device, and mainly includes an active element-added optical fiber 10, a pumping light source 20, a first optical fiber 30, a first FBG 35 provided in the first optical fiber 30, a second optical fiber 40, a second FBG 45 provided in the second optical fiber 40, an optical combiner 50, and a third optical fiber 60.

<Configuration of the Active Element-Added Optical Fiber>

Figure 2:
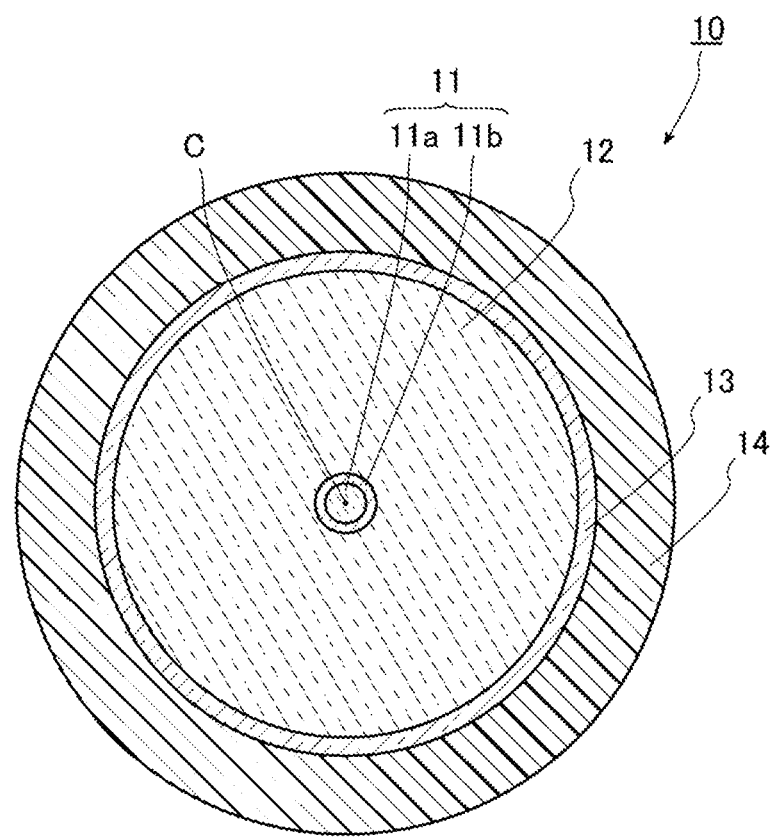
FIG. 2 is a diagram illustrating a state of a cross section perpendicular to a longitudinal direction of an active element-added optical fiber.

FIG. 2 is a cross-sectional view illustrating a state of a cross-section of the active element-added optical fiber 10 illustrated in FIG. 1. As illustrated in FIG. 2, the active element-added optical fiber 10 mainly includes a core 11, an inner cladding 12 surrounding the outer peripheral surface of the core 11 without a gap, an outer cladding 13 covering the outer peripheral surface of the inner cladding 12, and a cover layer 14 covering the outer cladding 13. The refractive index of the inner cladding 12 is lower than the refractive index of the core 11, and the refractive index of the outer cladding 13 is lower than the refractive index of the inner cladding 12. That is, the active element-added optical fiber 10 is a so-called double-clad optical fiber.

The core 11 has a first region 11a and a second region 11b. Description will be given below assuming that the radius of the core 11 is d and the distance from a central axis C in the radial direction of the core 11 is r. The first region 11a is a region from the central axis C to a radius ra. That is, the first region 11a is a region of $0 \leq r \leq ra$. However, the radius ra of the first region 11a is larger than 10% and 75% or less of the radius d of the core 11. That is, $0.1d < ra \leq 0.75d$. Further, the second region 11b is a region that surrounds the first region 11a and is from the outer peripheral surface of the first region 11a to the outer peripheral surface of the core 11. That is, the second region 11b is a region that surrounds the first region 11a without a gap and is of $ra < r \leq d$.

Figure 3:
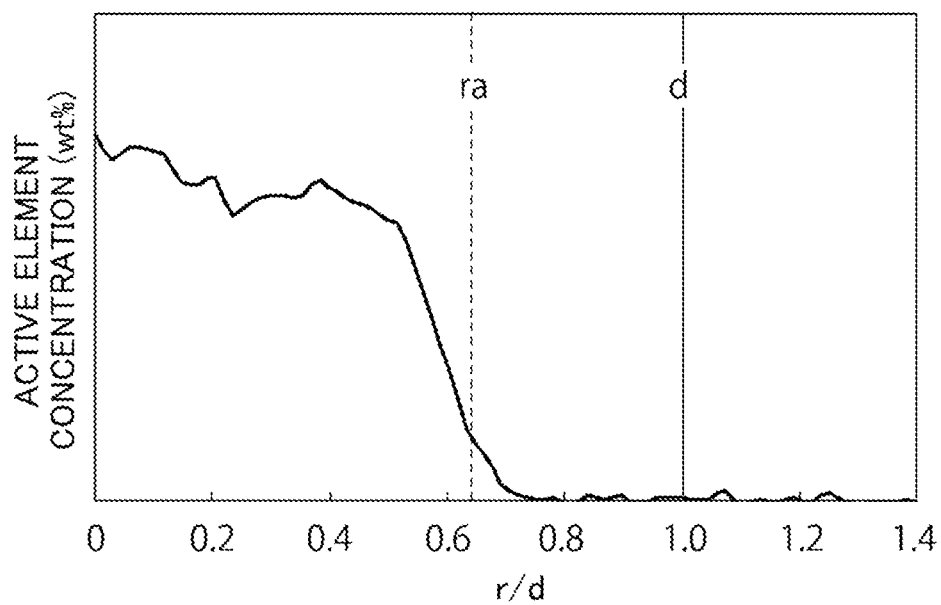
FIG. 3 is a diagram illustrating concentration distribution of an active element added to a core of an active element-added optical fiber.

An active element to be pumped by pumping light emitted from the pumping light source 20 is added to the core 11 in part. FIG. 3 is a diagram illustrating concentration distribution of an active element added to the core 11 of the active element-added optical fiber 10. As illustrated in FIG. 3, the first region 11a is made of quartz glass to which the active element is added throughout, and the second region 11b is made of quartz glass to which the active element is not added. Therefore, when the active element is added to a predetermined region in the radial direction, the first region 11a is the predetermined region and the radius of this predetermined region is ra in one or more embodiments.

Note that the region to which the active element is added means a region to which 0.5 wt % or more of the active element is added, and a region in which the active element is detected at a concentration lower than 0.5 wt % due to diffusion of the active element or the like at the time of manufacturing the active element-added optical fiber cannot be said to be a region to which the active element is added, but is a region to which the active element is not added.

Therefore, even when the active element is added throughout the first region 11a in an amount of 0.5 wt % or more and the active element is detected from the second region 11b, that is noise, manufacturing error, and the like, and the detection amount is lower than 0.5 wt %.

The concentration of the active element in the vicinity of the center of the first region 11a is made higher than the average concentration of the active element in the region to which the active element is added around the vicinity of the center. As illustrated in FIG. 3, the vicinity of the center is a region of 10% of the radius of the core. That is, the average value of the concentration of the active element in the region of $0 \leq r \leq 0.1d$ is higher than the average value of the concentration of the active element in the region of $0.1d < r \leq ra$.

Figure 4:
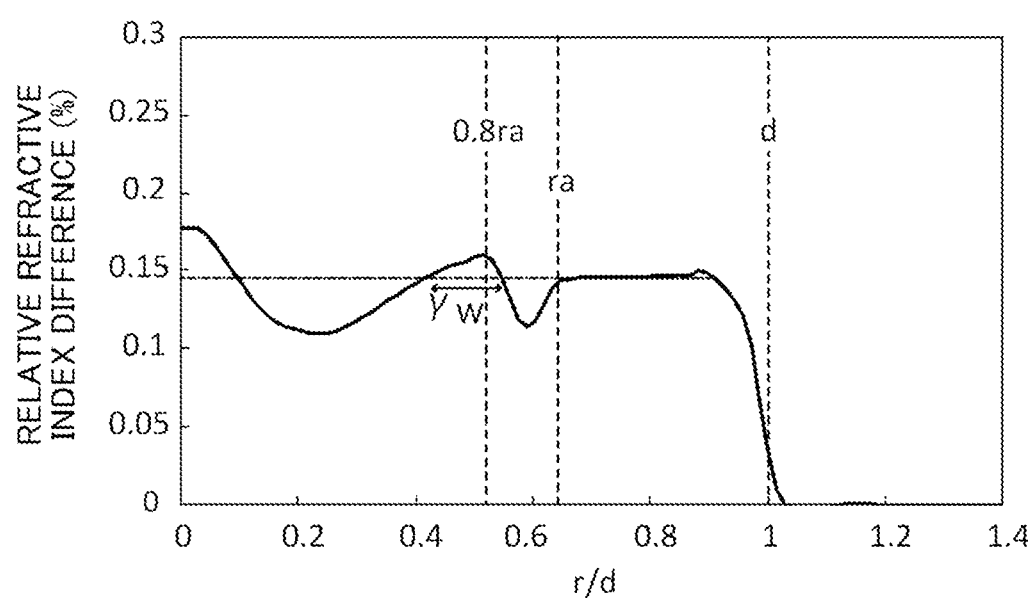
FIG. 4 is a diagram illustrating a state of a refractive index profile of a core of an active element-added optical fiber.

In one or more embodiments, the active element added to the first region 11a is ytterbium (Yb), and aluminum and phosphorus are further added to the first region 11a in order to enhance resistance to photodarkening. Further, for example, a dopant such as germanium (Ge) that increases the refractive index is added to the second region 11b. FIG. 4 is a diagram illustrating a state of the refractive index profile of the core 11 of the active element-added optical fiber 10. With such an additive and its concentration distribution, the first region 11a and the second region 11b have a refractive index profile illustrated in FIG. 4.

Note that in order to adjust the refractive index, a dopant such as fluorine (F) or boron (B) may be added at least in part. Further, although different from one or more embodiments, the active element added to the first region 11a may be an active element other than ytterbium. Examples of such active element include thulium (Tm), cerium (Ce), neodymium (Nd), europium (Eu), erbium (Er) and the like in addition to ytterbium as a rare earth element, and further include bismuth (Bi) and the like in addition to a rare earth element as an active element.

As illustrated in FIG. 4, the core 11 is a region from the central axis C to the inner cladding 12 where the relative refractive index difference is 0.05%, and is an inner side of a portion where the relative refractive index difference is 0.05% with respect to the inner cladding 12. In FIG. 4, the position where the relative refractive index difference is 0.05%, that is, the position of the outer peripheral surface of the core 11 is indicated by the broken lines. Note that the reason why the region of the core 11 is defined in this way is that even when the shape of the region having a relative refractive index difference of less than 0.05% is slightly changed, there is little influence on the optical characteristics of the active element-added optical fiber 10. Note that the relative refractive index difference of the core refers to a relative refractive index difference of the core with respect to a region of the cladding adjacent to the core.

In one or more embodiments, in the second region 11b, the refractive index increases from the boundary with the first region 11a to the vicinity of the inner periphery, the relative refractive index difference is substantially constant in the region from the vicinity of the inner periphery to the vicinity of the outer periphery, and the relative refractive index difference decreases toward the inner cladding 12 in the region in the vicinity of the outer periphery. In one or more embodiments, the standard deviation of the relative refractive index difference of the region of $1.1 ra < r \leq 0.9d$ is 0.01 or less, and only germanium is added to at least the region of $1.1 ra < r \leq d$ in the second region 11b to adjust the refractive index.

In one or more embodiments, the average value of the refractive index in the region of $0 \leq r \leq 0.1d$ is higher than the average value of the refractive index in the region of 0.1

$d \leq r \leq ra$. Further, the average value of the refractive index in the region of $0 \leq r \leq 0.1$ d is higher than the refractive index in the region of $r=0.2$ d.

Further, in the region of 0.2 $d<r \leq 0.9$ d, at least one maximum value position where the refractive index is maximum at a refractive index higher than the average value of the refractive index in the region of $0 \leq r \leq 0.9$ d exists. More specifically, the maximum value position refers to the position of the maximum value of the refractive index in a region where a length γw in the radial direction of the region having a refractive index higher than an average value γ of the refractive index in the region of $0 \leq r \leq 0.9$ d is 1/10 or more of the wavelength of light propagating through the active element-added optical fiber 10. As illustrated in FIG. 4, in one or more embodiments, two maximum value positions exist, and further two positions where the refractive index is minimum exist. Each maximum value position exists in the first region 11a, and such a maximum value position does not exist in the second region 11b. One maximum value position exists on the central axis, and the other maximum value position exists in the region of 0.4 $d<r \leq ra$. In the example illustrated in FIG. 4, the other maximum value position exists at a position where $r=0.5$ d substantially. In one or more embodiments, the refractive index profile in the vicinity of the other maximum value position is a refractive index profile in which the refractive index gradually decreases from the maximum value position toward at least an inner side of the core. The refractive index profile has one singular point where the monotonous decrease of the refractive index ends from the maximum value position toward the central axis side of the core 11, and the one singular point exists between the central axis of the core 11 and the maximum value position. Note that this refractive index profile has the other singular point at which the monotonous decrease of the refractive index ends from the maximum value position toward the cladding side. Further, the refractive index at these maximum value positions is higher than the refractive index in the region of 1.1 $ra<r \leq 0.9$ d where the standard deviation is 0.01 or less.

The active element-added optical fiber 10 is a few mode fiber, and in a case where at least light having a wavelength of 1070 nm propagates through the core 11, as the light, at least LP11 mode light can propagate in addition to light in the LP01 mode, which is the basic mode. Therefore, the effective cross-sectional area of light can be increased as compared with a case where the active element-added optical fiber 10 is a single mode fiber. Note that, in the active element-added optical fiber 10 of one or more embodiments, even in a case where light having a wavelength of 1030 nm to 1090 nm propagates, at least the LP11 mode light can propagate in addition to the light in the LP01 mode, which is the basic mode.

Here, the radius ra of the first region 11a will be described.

Figure 5:
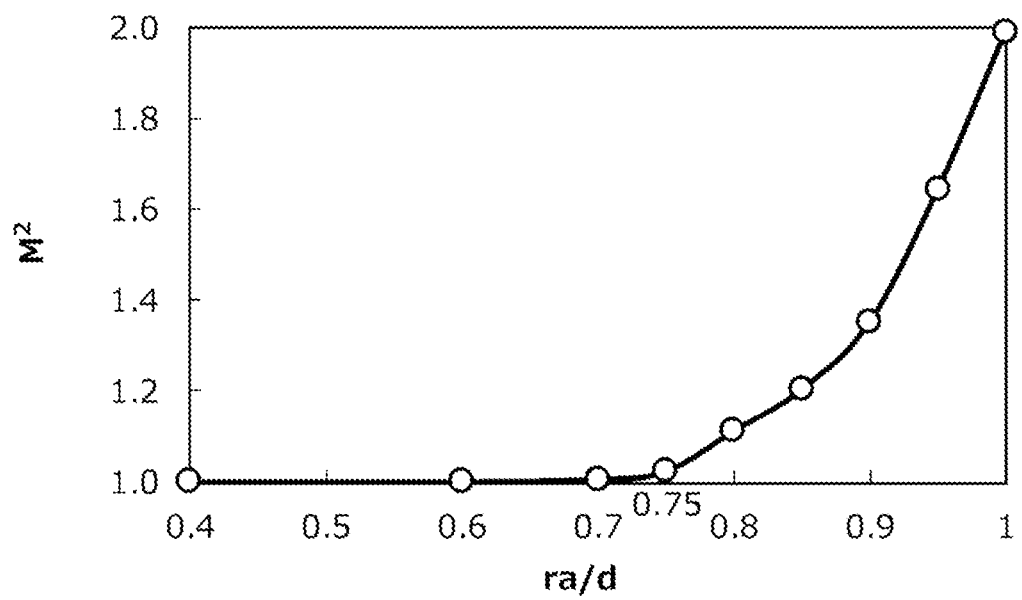
FIG. 5 is a diagram illustrating a relationship between a ratio of a radius of a core to a radius of a first region and beam quality of light emitted from an active element-added optical fiber.

FIG. 5 is a diagram illustrating a relationship between the ratio of the radius d of the core 11 to the radius ra of the first region and beam quality ($M^2$) of light emitted from the active element-added optical fiber 10. More specifically, FIG. 5 is a diagram in which the degree to which the mode of light propagating through the core 11 is amplified when the ratio ra/d of the radius d to the radius ra is changed is estimated by a numerical simulation and converted into beam quality ($M^2$). As illustrated in FIG. 5, it can be seen that when the ratio ra/d of the radius d of the core 11 to the radius ra of the first region 11a to which the active element is added throughout exceeds 0.7, that is, in the case of ra>0.7 d, the beam quality starts to deteriorate slightly. In other words, when ra≤0.7 d, deterioration of beam quality can be suppressed. Further, when ra/d is smaller than 0.7, that is, when ra≤0.7 d, $M^2$ converges to approximately 1, and it can be seen that deterioration of beam quality is further suppressed. On the other hand, it can be seen that when the ratio ra/d exceeds 0.75, amplification of higher modes increases, and the beam quality rapidly deteriorates. That is, as described above, when ra/d is 0.75 or less in the core 11 of the active element-added optical fiber 10, that is, when the radius ra of the first region 11a is 0<ra≤0.75 d, amplification of higher modes is suppressed in the active element-added optical fiber 10, and deterioration of beam quality of emitted light is suppressed. As described above, when the radius ra of the first region 11a is 0<ra≤0.75 d, amplification of higher modes is suppressed in the active element-added optical fiber 10, and deterioration of beam quality of emitted light is suppressed. Further, in the case of 0<ra≤0.7 d, amplification of higher modes is further suppressed in the active element-added optical fiber 10, and deterioration of beam quality of emitted light is further suppressed.

Note that when the radius ra of the first region 11a is larger than 0.1 d, the active element-added optical fiber can be easily manufactured using an existing manufacturing method such as an immersion method.

Figure 6:
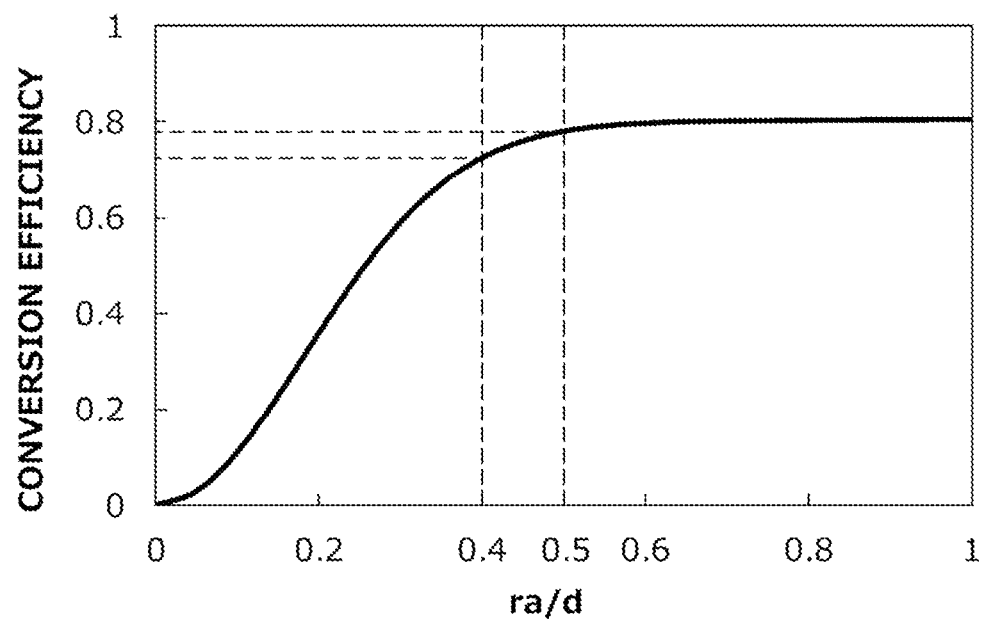
FIG. 6 is a diagram illustrating a relationship between a ratio of a radius of a core to a radius of a first region and conversion efficiency at which pumping light incident on an active element-added optical fiber is converted into light emitted from the active element-added optical fiber.

FIG. 6 is a diagram illustrating a relationship between the ratio of the radius d of the core 11 to the radius ra of the first region 11a and conversion efficiency at which pumping light incident on the active element-added optical fiber 10 is converted into light emitted from the active element-added optical fiber 10. The conversion efficiency is indicated by "power of light emitted from the active element-added optical fiber 10/power of pumping light incident on the active element-added optical fiber 10". As illustrated in FIG. 6, when the ratio (ra/d) of the radius d of the core 11 to the radius ra of the first region 11a is 0.4, the ratio is approximately 90% of the maximum conversion efficiency, and further when ra/d is larger than 0.4, that is, when 0.4 d<ra, the ratio to the maximum value of the conversion efficiency is larger than 90%. Note that, as described above, in a case where ra/d is 0.75 or less, deterioration of beam quality of emitted light is suppressed. That is, when ra/d is 0.75 or less, it is possible to produce a laser with good beam quality while suppressing a reduction in conversion efficiency by setting ra/d to be larger than 0.4. Therefore, the ratio of the radius d of the core 11 and the radius ra of the first region 11a may be larger than 0.4 with respect to the conversion efficiency. That is, the core satisfies 0.4 d<ra in one or more embodiments, from the viewpoint of increasing the efficiency of amplification of light. Furthermore, when the ratio of the radius d of the core 11 and the radius ra of the first region 11a is 0.5, the ratio is approximately 97% of the maximum conversion efficiency. Therefore, the ratio of the radius d of the core 11 and the radius ra of the first region 11a may be larger than 0.5 with respect to the conversion efficiency. That is, the core satisfies 0.5 d<ra in one or more embodiments, from the viewpoint of further increasing the efficiency of amplification of light. Further, when 0.5 d<ra, the basic mode can be efficiently amplified while the amplification of higher modes is suppressed.

<Configuration Other than the Active Element-Added Optical Fiber>

The first optical fiber 30 is a double-clad optical fiber in which the configuration of the core is different from the configuration of the core 11 of the active element-added optical fiber 10. The first optical fiber 30 is connected to one end of the active element-added optical fiber 10. Therefore, the core 11 of the active element-added optical fiber 10 and the core of the first optical fiber 30 are optically coupled, and the inner cladding 12 of the active element-added optical fiber 10 and the inner cladding of the first optical fiber 30 are optically coupled.

The core of the first optical fiber 30 is mainly different from the core 11 of the active element-added optical fiber 10 in that the active element is not added. The first optical fiber 30 is a few mode fiber, and propagates light that is similar to the light propagating through the core 11 of the active element-added optical fiber 10. Therefore, each LP mode light propagating through the core 11 of the active element-added optical fiber 10 can propagate through the core of the first optical fiber 30 as it is. Note that the definition of the core of the first optical fiber 30 is similar to the definition of the core 11 of the active element-added optical fiber 10.

As described above, the first FBG 35 is provided in the first optical fiber 30. In this way, the first FBG 35 is disposed on one side of the active element-added optical fiber 10 and optically coupled to the core 11 of the active element-added optical fiber 10. In the first FBG 35, a high refractive index portion having a refractive index higher than that of a portion other than the first FBG 35 in the core and a low refractive index portion having a refractive index similar to that of a portion other than the first FBG 35 in the core are periodically repeated along the longitudinal direction of the core. The repeating pattern of the high refractive index portion is formed, for example, by irradiating a site to be the high refractive index portion with ultraviolet rays. The first FBG 35 formed in this manner is configured as a first mirror that reflects light including a predetermined wavelength within light emitted when the active element added to the core 11 of the active element-added optical fiber 10 is in a pumped state. For example, when the active element added to the core 11 of the active element-added optical fiber 10 is ytterbium as in one or more embodiments, the predetermined wavelength is, for example, 1030 nm to 1090 nm, and 1070 nm. Further, the reflectance of the first FBG 35 is higher than the reflectance of the second FBG 45 to be described later, and light including the predetermined wavelength is reflected, for example, at 99% or more.

The second optical fiber 40, which does not have the outer cladding, is different from the first optical fiber 30, and the other configuration of the second optical fiber 40 is similar to the configuration of the first optical fiber 30 other than the outer cladding. Therefore, the second optical fiber 40 has a configuration in which the cladding surrounds the core and the cladding is covered with the cover layer. The second optical fiber 40 is connected to the other end of the active element-added optical fiber 10. Therefore, the core 11 of the active element-added optical fiber 10 and the core of the second optical fiber 40 are optically coupled, and the inner cladding 12 of the active element-added optical fiber 10 and the cladding of the second optical fiber 40 are optically coupled. Therefore, the few mode light propagating through the core 11 of the active element-added optical fiber 10 propagates through the core of the second optical fiber 40 in the few mode. Note that, in the case of the configuration of the fiber laser device 1 illustrated in FIG. 1, the inner cladding 12 of the active element-added optical fiber 10 and the cladding of the second optical fiber 40 may not be optically coupled.

The second FBG 45 is provided in the core of the second optical fiber 40 as described above. In this way, the second FBG 45 is disposed on the other side of the active element-added optical fiber 10 and optically coupled to the core 11 of the active element-added optical fiber 10. Similar to the first FBG 35, the second FBG 45 is formed by a periodical repetition of a high refractive index portion and a low refractive index portion. The second FBG 45 is configured as a second mirror that reflects light including a predetermined wavelength reflected by the first FBG 35 at a lower reflectance than the first FBG 35. When light reflected by the first FBG 35 is incident, the second FBG 45 reflects the light at a reflectance of, for example, about 10%. In this way, a resonator is formed by the first FBG 35, the active element-added optical fiber 10, and the second FBG 45. Further, in one or more embodiments, nothing is particularly connected to the other end of the second optical fiber 40 on the side opposite to the active element-added optical fiber 10, but a glass rod or the like having a diameter larger than that of the core of the second optical fiber 40 may be connected.

The pumping light source 20 includes a plurality of laser diodes 21. In one or more embodiments, the laser diodes 21 are, for example, a Fabry-Perot type semiconductor laser made of a GaAs-based semiconductor, and emits pumping light having a center wavelength of 915 nm. Further, each laser diode 21 of the pumping light source 20 is connected to an optical fiber 25, and the pumping light emitted from the laser diode 21 propagates through the optical fiber 25 as, for example, multimode light.

Each optical fiber 25 is connected to one end of the first optical fiber 30 in the optical combiner 50. Specifically, the cores of the respective optical fibers 25 are connected to the inner cladding of the first optical fiber 30 so that the cores of the respective optical fibers 25 are optically coupled to the inner cladding of the first optical fiber 30. Therefore, the pumping light emitted from each laser diode 21 is incident on the inner cladding of the first optical fiber 30 via the optical fiber 25, and is incident on the inner cladding 12 of the active element-added optical fiber 10 from the inner cladding of the first optical fiber 30.

The third optical fiber 60 is an optical fiber having a core and a cladding. The core of the third optical fiber 60 is connected to the core of the first optical fiber 30 in the optical combiner 50. Therefore, the light propagating through the core of the first optical fiber 30 toward the optical combiner 50 is incident on the core of the third optical fiber 60. Further, on the side of the third optical fiber 60 opposite to the side connected to the first optical fiber 30, a terminal portion 65 that converts light into heat is provided.

Next, the operation of the fiber laser device 1 will be described.

First, pumping light is emitted from each laser diode 21 of the pumping light source 20. This pumping light is incident on the inner cladding 12 of the active element-added optical fiber 10 from the optical fiber 25 via the inner cladding of the first optical fiber 30, and mainly propagates through the inner cladding 12. The pumping light propagating through the inner cladding 12 pumps the active element added to the core 11 when passing through the core 11. The active element in the pumped state emits spontaneous emission light in a wavelength band including a predetermined wavelength. With this spontaneous emission light as a starting point, light including the predetermined wavelength commonly reflected by the first FBG 35 and the second FBG 45 resonates between the first FBG 35 and the second FBG 45. When the resonating light propagates through the core 11 of the active element-added optical fiber 10, the active element in the pumped state causes stimulated emission, and the resonating light is amplified. A part of the resonating light is transmitted through the second FBG 45 and emitted from the second optical fiber 40. Then, when the gain and the loss in the resonator including the first FBG 35, the active element-added optical fiber 10, and the second FBG 45 become equal, a laser oscillation state is formed, and light having a constant power is emitted from the second optical fiber 40.

Note that a major part of the light propagating from the active element-added optical fiber 10 side to the first optical fiber 30 and transmitted through the first FBG 35 is converted into heat at the terminal portion 65 and disappears.

Incidentally, as described above, each of the active element-added optical fiber 10, the first optical fiber 30, and the second optical fiber 40 is a few mode fiber that enables propagation of the LP11 mode light. Therefore, the LP11 mode light can be excited at the connection point between the first optical fiber 30 and the active element-added optical fiber 10, the connection point between the second optical fiber 40 and the active element-added optical fiber 10, and other positions. However, in the active element-added optical fiber 10, the LP01 mode light is amplified, and the amplification of light in a higher mode is suppressed. Therefore, the light emitted from the second optical fiber 40 can be light in which amplification of the LP11 mode light is suppressed. Therefore, with the fiber laser device 1 of one or more embodiments, light in which deterioration of beam quality is suppressed can be emitted.

As described above, in the active element-added optical fiber 10 of one or more embodiments, the radius ra of the first region 11a to which the active element is added throughout is 0.1 d<ra≤0.75 d, and the active element is not added to the second region 11b. Furthermore, the average value of the concentration of the active element in the region of 0≤r≤0.1 d is higher than the average value of the concentration of the active element in the region of 0.1 d<r≤ra, and in the region of 0.2 d<r≤0.9 d, at least one maximum value position at a refractive index higher than the average value of the refractive index in the region of 0≤r≤0.9 d exists.

By adding the active element to the first region 11a having the above radius and not adding the active element to the second region 11b, while the light in the basic mode propagating through the core 11 is amplified, the amplification of light in a higher mode can be suppressed. Further, when the average value of the concentration of the active element in the region of 0≤r≤0.1 d is higher than the average value of the concentration of the active element in the region of 0.1 d<r≤ra, the LP01 mode light propagating through the core can be further amplified. On the other hand, in the region of 0.2 d<r≤0.9 d, when at least one maximum value position at a refractive index higher than the average value of the refractive index in the region of 0≤r≤0.9 d exists, it is possible to suppress the LP01 mode light from being excessively concentrated in the vicinity of the central axis and to increase the effective cross-sectional area of the LP01 mode light. Therefore, occurrence of stimulated Raman scattering can be suppressed. Therefore, with the active element-added optical fiber of one or more embodiments, deterioration of beam quality can be suppressed and light can be amplified.

Further, as described above, the refractive index profile in the vicinity of the other maximum value position is a refractive index profile in which the refractive index gradually decreases from the maximum value position toward at least an inner side of the core. In such a refractive index profile, for example, as compared with a refractive index profile in which the refractive index protrudes in a shape in which the maximum value position and the vicinity thereof are convex upward with respect to a rectangular refractive index profile, the maximum value position is likely to be away from the central axis because of an inclination of the refractive index. As described above, the maximum value position is away from the central axis, so that the LP01 mode light can be further suppressed from being excessively concentrated in the vicinity of the central axis of the core, and the effective cross-sectional area of the LP01 mode light can be further increased. Therefore, the occurrence of stimulated Raman scattering can be suppressed, deterioration of beam quality can be suppressed, and light can be amplified.

Therefore, with the resonator including the active element-added optical fiber, and the fiber laser device 1, light in which deterioration of beam quality is suppressed can be emitted.

Further, in the active element-added optical fiber 10 of one or more embodiments, the average value of the refractive index in the region of 0≤r≤0.1 d is higher than the refractive index in the region of r=0.2 d. Therefore, the efficiency of amplification of the LP01 mode light can be further increased. However, the refractive index in the region of r=0.2 d may be equal to or more than the average value of the refractive index in the region of 0≤r≤0.1 d.

Further, in the active element-added optical fiber 10 of one or more embodiments, at least one maximum value position exists in the region of 0.4 d<r≤ra. Therefore, it is possible to efficiently amplify the LP01 mode light by suppressing the LP01 mode light from being excessively concentrated on the center of the core 11 and suppressing protrusion of the LP01 mode light from the first region 11a. Note that the maximum value position may not exist in such a range.

Further, in the active element-added optical fiber 10 of one or more embodiments, the standard deviation of the relative refractive index difference of the region of 1.1 ra<r≤0.9 d is 0.01 or less. In general, the refractive index on the outer peripheral side of the core is likely to influence the distribution of the power of the light propagating through the core. Therefore, with such a configuration, it is possible to suppress unintentional disturbance of the power of the light. Note that the standard deviation of the relative refractive index difference of the region of 1.1 ra<r≤0.9 d may not be 0.01 or less.

Further, in the active element-added optical fiber 10 of one or more embodiments, the region of 1.1 ra<r≤d is made of quartz to which only germanium is added. Therefore, the standard deviation of the relative refractive index difference of the region of 1.1 ra<r≤0.9 d can be easily 0.01 or less. However, as long as the active element is not added to the second region 11b, a dopant other than germanium may be added to the region of 1.1 ra<r≤d.

Although the present invention has been described by taking the embodiments as examples, the present invention is not limited to the above embodiments, and the configuration can be appropriately changed within the scope of the present invention.

Figure 7:
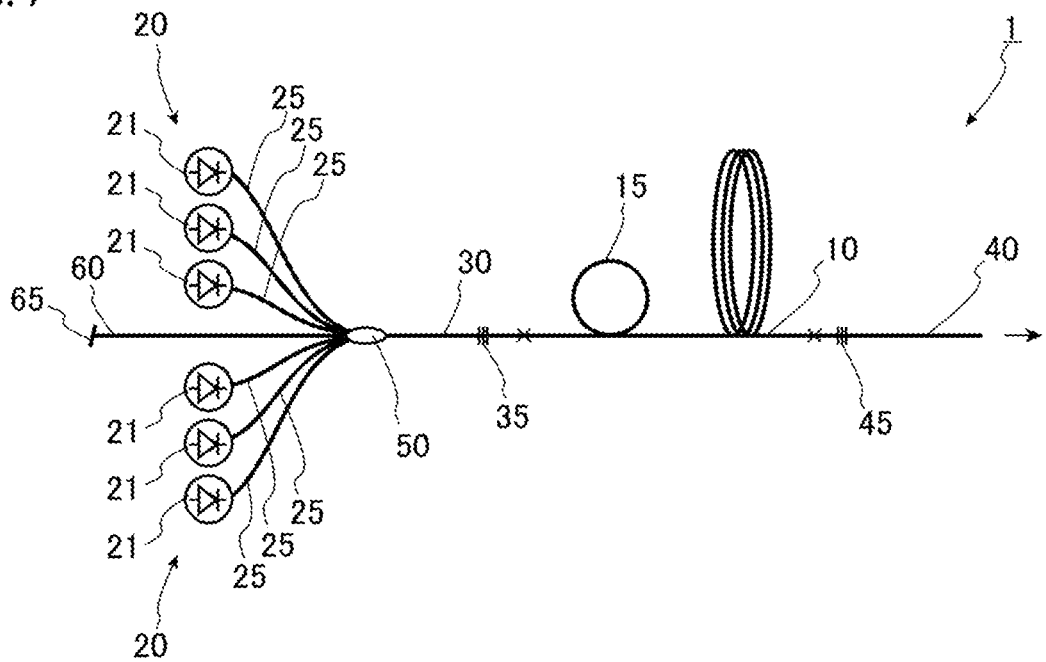
FIG. 7 is a diagram illustrating a variation of a fiber laser device.

For example, the theoretical cutoff wavelength of the LP02 mode light of the active element-added optical fiber 10 of the embodiments described above may be shorter than 1760 nm. By setting the theoretical cutoff wavelength of the LP02 mode light in this manner, for example, in a case where the active element-added optical fiber 10 is bent at a diameter of 120 mm and light of 1070 nm is caused to propagate through the active element-added optical fiber 10, the cutoff wavelength in the LP02 mode can be shorter than 1070 nm at the site of the active element-added optical fiber 10 bent at a diameter of 120 mm, and the LP02 mode light can be leaked while the LP01 mode light is propagated. FIG. 7 is a diagram illustrating a variation of the fiber laser device 1. Specifically, it is a diagram illustrating a fiber laser device having a site of the active element-added optical fiber 10 bent at a diameter of 120 mm as described above. Note that, in the description of FIG. 7, the same configurations as those described in the above embodiments are denoted by the same reference numerals, and redundant description is omitted unless otherwise specified. The fiber laser device 1 of FIG. 7 is different from the fiber laser device of the above embodiments in that the theoretical cutoff wavelength of the LP02 mode light of the active element-added optical fiber 10 is shorter than 1760 nm, and the active element-added optical fiber 10 has a bent portion 15 bent at a diameter of 120 mm. Light having a wavelength of 1760 nm propagates through the bent portion 15, so that the LP02 mode light can be leaked. Therefore, when the active element-added optical fiber 10 has the bent portion 15, it is possible to suppress propagation of the light in a higher mode, which is an even mode, while propagating the LP01 mode light.

Figure 8:
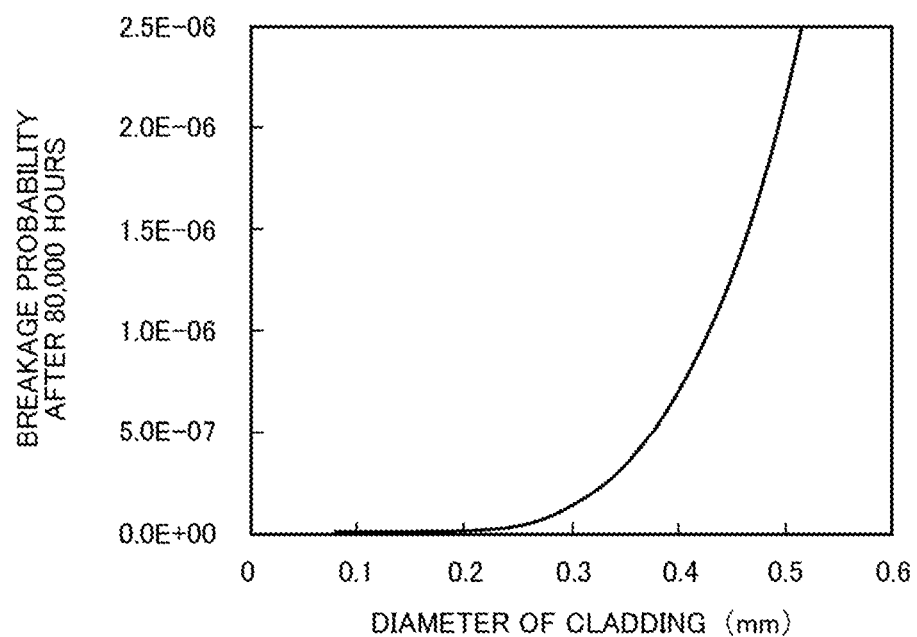
FIG. 8 is a diagram illustrating a relationship between a diameter of a cladding and a breakage probability.

Incidentally, there is a concern that when the active element-added optical fiber 10 is bent at a diameter of 120 mm, the active element-added optical fiber 10 can be broken. Therefore, in this case, the diameter of the cladding made of quartz glass of the active element-added optical fiber 10 may be set to be within a predetermined size. The cladding made of quartz glass is the inner cladding 12 when the outer cladding 13 is made of resin, and is the inner cladding 12 and the outer cladding 13 when the outer cladding 13 is made of quartz glass. FIG. 8 is a diagram illustrating a relationship between a diameter of a cladding and a breakage probability. This breakage probability is the breakage probability of an optical fiber after 80,000 hours in a case where an optical fiber having a cladding made of quartz glass is wound one turn with a diameter of 120 mm and a load that increases the length of the optical fiber by 1% is applied. From FIG. 8, when the diameter of the cladding is 430 μm or less, the breakage probability of the optical fiber after 80,000 hours can be suppressed to $10^{-6}$ or less. Therefore, when the outer cladding 13 is made of resin, the diameter of the inner cladding 12 may be 430 μm or less, and when the outer cladding 13 is made of quartz glass, the diameter of the outer cladding 13 may be 430 μm or less.

Further, in the above embodiments, the resonator-type fiber laser device has been described as an example of the fiber laser device, but the fiber laser device using the active element-added optical fiber 10 of one or more embodiments may be, for example, of a master oscillator-power amplifier (MO-PA) type in which pumping light and seed light are incident on the active element-added optical fiber 10.

Further, in the above embodiments, the region in which the relative refractive index difference is 0.05% from the central axis C to the inner cladding 12 is the core 11, but the region to be the core may not be the region in which the relative refractive index difference is 0.05% as long as it is the region in which the relative refractive index difference from the central axis to the inner cladding of the optical fiber is larger than 0%.

Further, in the above embodiments, the example in which the average value of the concentration of the active element in the region of 0≤r≤0.1 d is higher than the average value of the concentration of the active element in the region of 0.1 d<r≤ra has been described, but the average value of the concentration of the active element in the region of 0≤r≤0.1 d may not be higher than the average value of the concentration of the active element in the region of 0.1 d<r≤ra. Even when the average value of the concentration of the active element in the region of 0≤r≤0.1 d is not higher than the average value of the concentration of the active element in the region of 0.1 d<r≤ra, it is possible to obtain an active element-added optical fiber capable of suppressing deterioration of beam quality.

Further, the average value of the refractive index in the region of 0.1 d≤r≤0.8 ra may be higher than the average value of the refractive index in the region of 1.1 ra≤r≤0.9 d. In this case, by increasing the maximum value of the refractive index in the range of 0.2 d<r<0.9 d, the effective cross-sectional area of light propagating through the core can be further increased.

Further, the average value of the refractive index in the region of 0.1 d≤r≤0.8 ra may be lower than the average value of the refractive index in the region of 1.1 ra≤r≤0.9 d. In this case, the spread of the electric field distribution of the light propagating through the optical fiber can be suppressed, and the effective cross-sectional area of the light propagating through the core can be reduced. Therefore, a difference in propagation constant between the LP01 mode and the LP11 mode can be increased, and deterioration of beam quality can be suppressed.

Further, the average value of the refractive index in the region of 0.1 d≤r≤0.8 ra may be equal to the average value of the refractive index in the region of 1.1 ra≤r≤0.9 d. In this case, when the effect that the maximum value of the refractive index in the range of r<0.1 d reduces the effective cross-sectional area is equivalent to the effect that the maximum value of the refractive index in the range of 0.2 d<r<0.9 d increases the effective cross-sectional area, the optical fiber according to one or more embodiments and the optical fiber having a rectangular refractive index profile can be connected while suppressing the optical loss.

Further, the maximum value position may be formed by an element other than the active element added to the core. This point will be described below.

Figure 9:
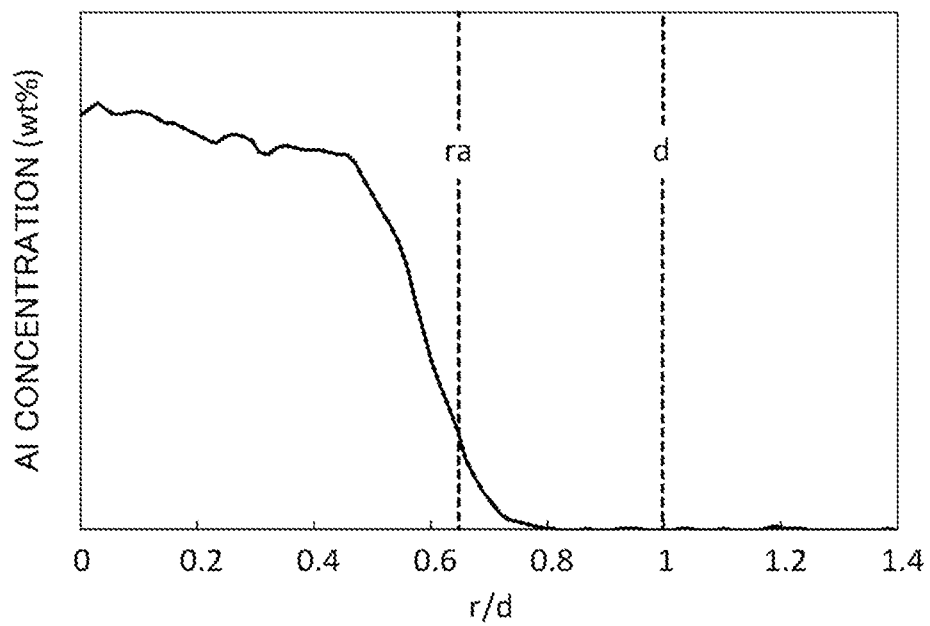
FIG. 9 is a diagram illustrating concentration distribution of aluminum added to the first region of the core.
Figure 10:
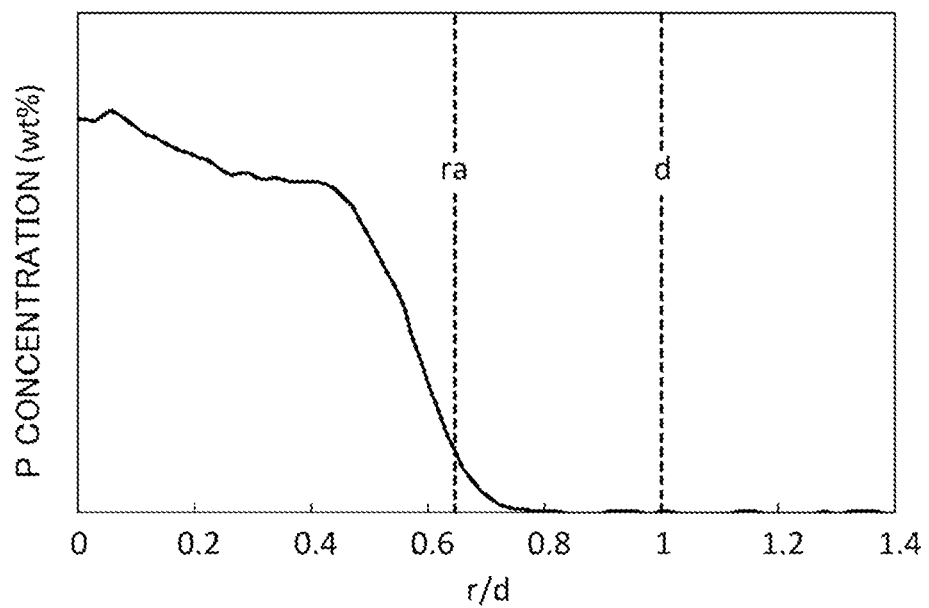
FIG. 10 is a diagram illustrating concentration distribution of phosphorus added to the first region of the core.
Figure 11:
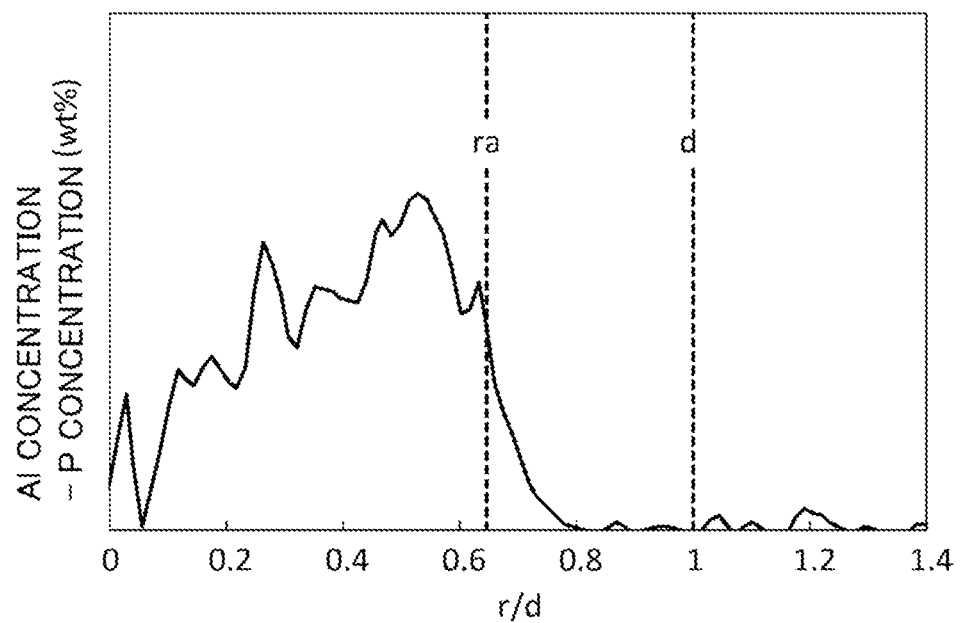
FIG. 11 is a diagram illustrating an example of concentration difference distribution of aluminum and phosphorus added to the first region of the core.
Figure 12:
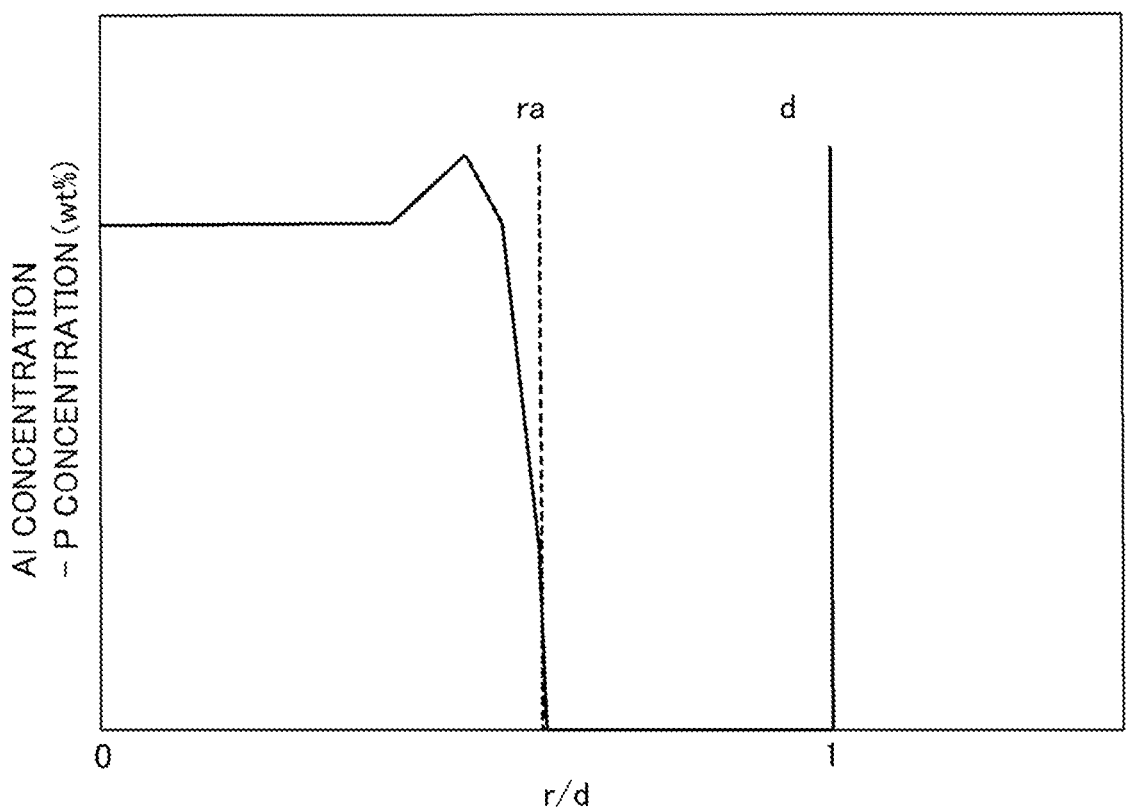
FIG. 12 is a diagram illustrating another example of concentration difference distribution of aluminum and phosphorus added to the first region of the core.

For example, aluminum and phosphorus may be added to at least a part of the first region of the core together with the active element. By adding aluminum or phosphorus to the core together with the active element, it is possible to suppress photodarkening. Further, in the case of co-adding aluminum and phosphorus, when the concentration of aluminum is higher than the concentration of phosphorus, aluminum acts as an up-dopant that increases the refractive index, and phosphorus acts as a down-dopant that reduces the refractive index. On the other hand, when the concentration of phosphorus is higher than the concentration of aluminum, phosphorus acts as an up-dopant, and aluminum acts as a down-dopant. Therefore, by co-adding aluminum and phosphorus at different concentrations, it is possible to suppress photodarkening while suppressing an excessive increase in the refractive index of the core. When the up-dopant and the down-dopant are further added to the first region as described above, for example, aluminum may be added in the concentration distribution illustrated in FIG. 9, and phosphorus may be added in the concentration distribution illustrated in FIG. 10. In this case, the distribution of the concentration difference between aluminum and phosphorus as illustrated in FIG. 11 is formed, and the maximum value position is formed in the vicinity of 0.5 d where the concentration difference is maximum. Further, also by the distribution of the concentration difference between aluminum and phosphorus as illustrated in FIG. 12, the maximum value position is formed in the vicinity of 0.5 d. Note that, by adjusting the concentration distribution of each of the up-dopant and the down-dopant added to the first region, the maximum value position can be formed at a position different from the vicinity of 0.5 d in the first region.

Figure 13:
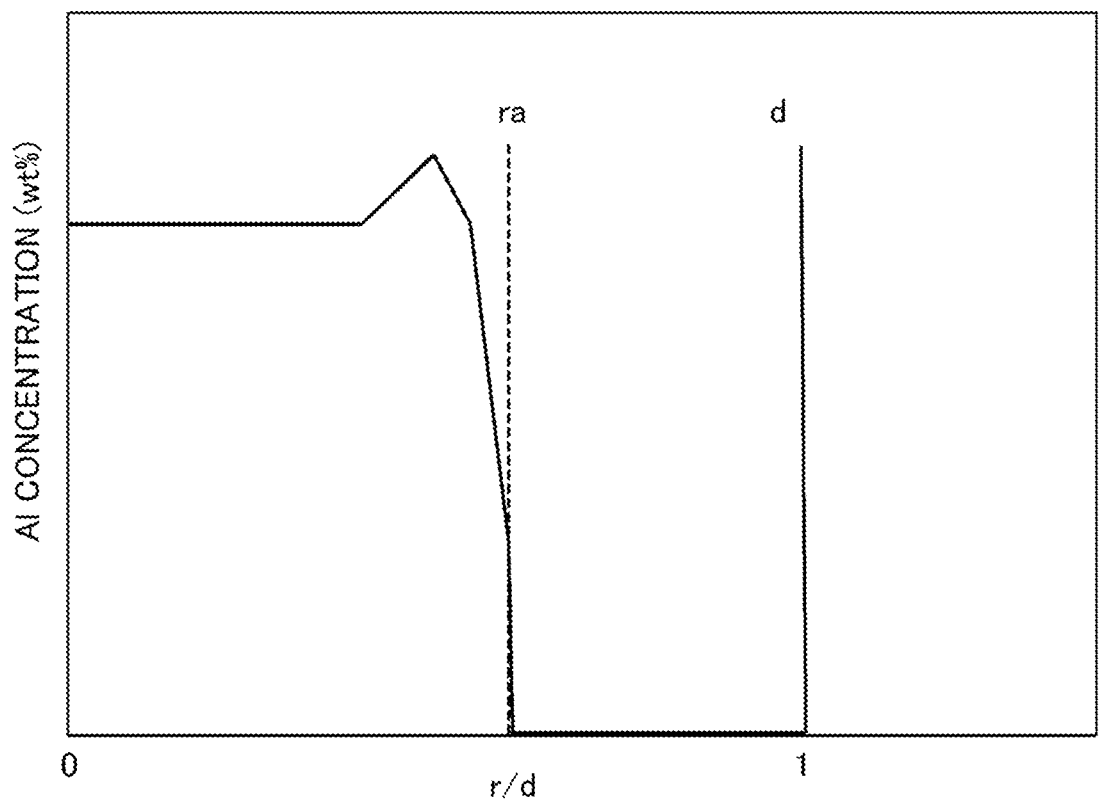
FIG. 13 is a diagram illustrating an example of an aluminum concentration distribution in a case where aluminum is added to the first region of the core and phosphorus is not added.
Figure 14:
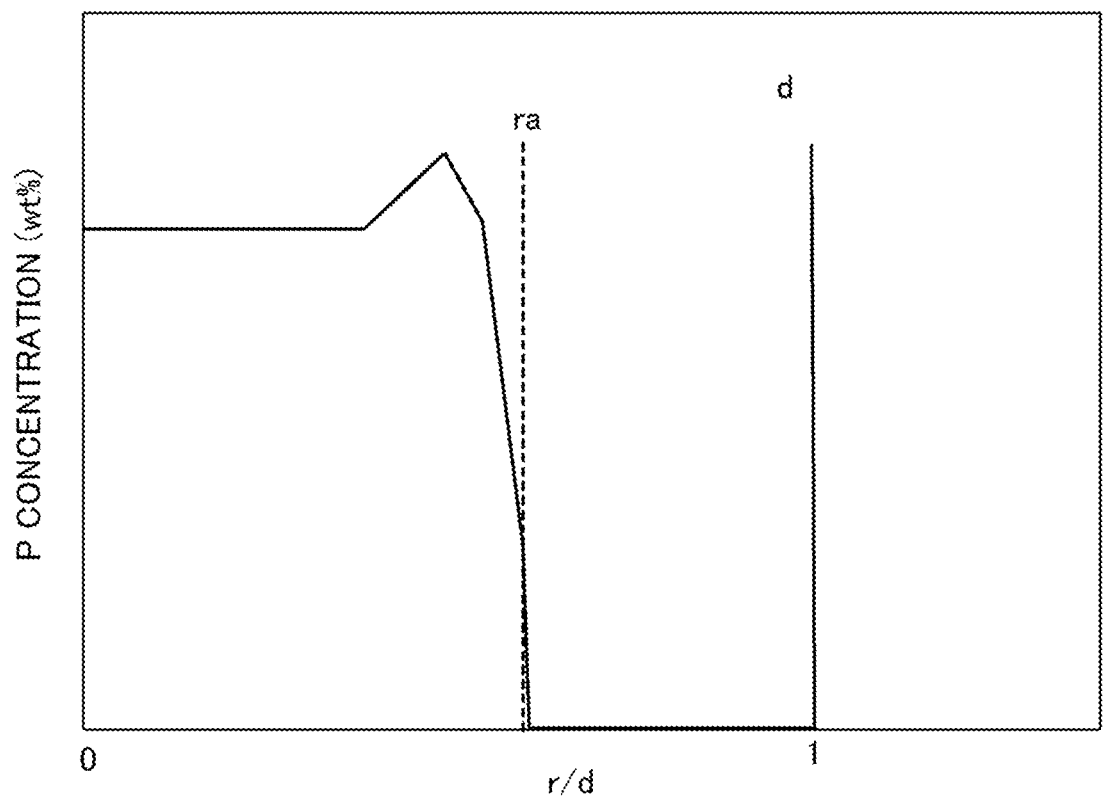
FIG. 14 is a diagram illustrating an example of a phosphorus concentration distribution in a case where phosphorus is added to the first region of the core and aluminum is not added.

Further, an up-dopant may be added to the first region of the core together with the active element. For example, aluminum may be further added as an up-dopant to at least a part of the first region. For example, in the example illustrated in FIG. 13, aluminum is added so that the concentration of aluminum is maximized at the maximum value position in the vicinity of 0.5 d illustrated in FIG. 11. When aluminum, which is an up-dopant, is added in such a concentration distribution, the refractive index is further increased in the vicinity of 0.5 d, and it becomes easy to form the maximum value position in the vicinity of 0.5 d. Further, in the example illustrated in FIG. 14, phosphorus is added so that the concentration of phosphorus is maximized at the maximum value position in the vicinity of 0.5 d illustrated in FIG. 4. When phosphorus, which is an up-dopant, is added in such a concentration distribution, the refractive index is further increased in the vicinity of 0.5 d, and it becomes easy to form the maximum value position in the vicinity of 0.5 d. Note that, by adjusting the concentration distribution of the up-dopant added to the first region, the maximum value position can be formed at a position different from the vicinity of 0.5 d in the first region.

Figure 15:
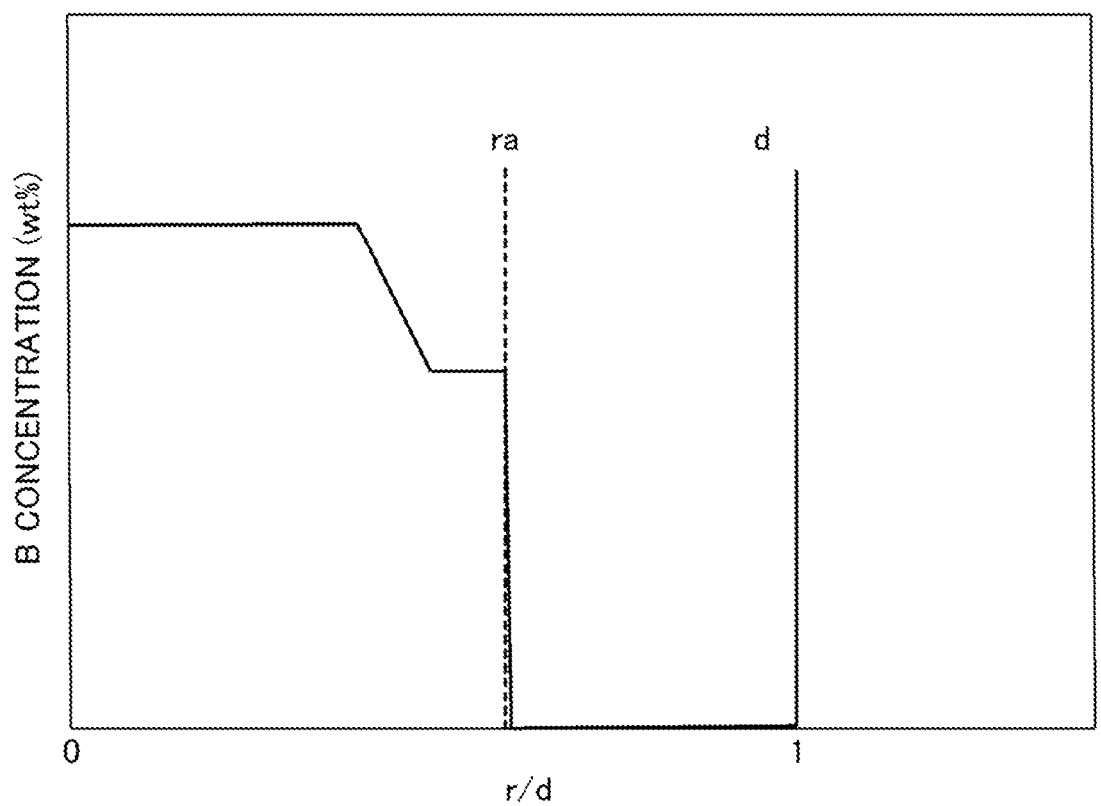
FIG. 15 is a diagram illustrating an example of concentration distribution in a case where boron is added to the first region of the core.

Further, a down-dopant may be added to at least a part of the first region of the core together with the active element. For example, boron may be further added to the first region as a down-dopant. For example, in the example illustrated in FIG. 15, boron is added so that the concentration of boron is minimized at the maximum value position in the vicinity of 0.5 d illustrated in FIG. 11. When boron, which is a down-dopant, is added in such a concentration distribution, a reduction in refractive index in the vicinity of 0.5 d is suppressed, and it becomes easy to form the maximum value position in the vicinity of 0.5 d. Note that, by adjusting the concentration distribution of the down-dopant added to the first region, the maximum value position can be formed at a position different from the vicinity of 0.5 d in the first region.

Note that the up-dopant is not limited to the above, but may be, for example, germanium. Further, the down-dopant is not limited to the above, but may be, for example, fluorine.

One or more embodiments of the present invention will be described below more specifically with reference to examples and comparative examples, but the present invention is not limited to the examples described below.

Examples 1 to 33

The active element-added optical fiber illustrated in FIG. 2 was prepared as Examples 1 to 33. In these active element-added optical fibers, ytterbium was added throughout the first region 11a, and the active element was not added to the second region 11b. Further, aluminum, phosphorus, and boron were added to the first region to adjust the refractive index. The values below of the active element-added optical fibers of Examples 1 to 30 are shown in Table 1. A: the average value (wt %) of the concentration of ytterbium in the region of $0 \leq r \leq 0.1$ d; B: the average value (wt %) of the concentration of the active element in the region of $0.1$ d$< r \leq$ra; C: the average value (%) of the relative refractive index difference with respect to the inner cladding 12 in the region of $0 \leq r \leq 0.1$ d; D: the relative refractive index difference (%) with respect to the inner cladding 12 in the region of r=0.2 d; E: the relative refractive index difference (%) with respect to the cladding at the maximum value position in the region of $0.2$ d$< r \leq 0.9$ d; F: the maximum value position when d=1; G: the radius ra of the first region 11a when d=1; H: the average value (%) of the relative refractive index difference with respect to the inner cladding 12 in the region of $0 \leq r \leq 0.9$ d, and I: the standard deviation of the distribution of the relative refractive index difference with respect to the inner cladding 12 in the region of $1.1$ ra$< r \leq 0.9$ d. Note that the relative refractive index profile of the active element-added optical fiber of Example 4 is as illustrated in FIG. 4, and the concentration distribution of ytterbium added to the core of the active element-added optical fiber is as illustrated in FIG. 3. Further, the active element-added optical fibers were an optical fiber in which the theoretical cutoff wavelength in the LP02 mode was shorter than 1760 nm.

TABLE 1

|  | A | B | C | D | E | F | G | H | I |
|---|---|---|---|---|---|---|---|---|---|
| Example 1 | 2.54 | 2.11 | 0.184 | 0.121 | 0.18 | 0.529 | 0.676 | 0.142 | 0.002 |
| Example 2 | 2.48 | 2.01 | 0.165 | 0.107 | 0.17 | 0.514 | 0.643 | 0.138 | 0.004 |
| Example 3 | 2.44 | 2.01 | 0.160 | 0.108 | 0.17 | 0.529 | 0.662 | 0.135 | 0.003 |
| Example 4 | 2.53 | 1.95 | 0.168 | 0.112 | 0.16 | 0.515 | 0.647 | 0.139 | 0.001 |
| Example 5 | 2.56 | 1.94 | 0.155 | 0.112 | 0.15 | 0.515 | 0.632 | 0.137 | 0.002 |
| Example 6 | 2.77 | 2.14 | 0.169 | 0.124 | 0.17 | 0.514 | 0.671 | 0.146 | 0.002 |
| Example 7 | 2.71 | 2.15 | 0.190 | 0.138 | 0.18 | 0.458 | 0.639 | 0.156 | 0.001 |
| Example 8 | 2.56 | 2.06 | 0.150 | 0.115 | 0.15 | 0.485 | 0.647 | 0.131 | 0.001 |
| Example 9 | 2.79 | 2.14 | 0.160 | 0.119 | 0.15 | 0.471 | 0.662 | 0.134 | 0.001 |
| Example 10 | 2.57 | 2.13 | 0.156 | 0.116 | 0.16 | 0.478 | 0.716 | 0.133 | 0.001 |
| Example 11 | 2.64 | 2.07 | 0.164 | 0.120 | 0.15 | 0.471 | 0.632 | 0.134 | 0.001 |
| Example 12 | 2.68 | 2.04 | 0.168 | 0.118 | 0.16 | 0.463 | 0.642 | 0.134 | 0.001 |
| Example 13 | 2.39 | 2.02 | 0.178 | 0.133 | 0.19 | 0.514 | 0.639 | 0.149 | 0.001 |
| Example 14 | 2.36 | 1.98 | 0.149 | 0.106 | 0.14 | 0.529 | 0.662 | 0.123 | 0.001 |
| Example 15 | 2.54 | 1.93 | 0.148 | 0.110 | 0.15 | 0.537 | 0.672 | 0.126 | 0.001 |
| Example 16 | 2.60 | 2.11 | 0.165 | 0.110 | 0.16 | 0.493 | 0.657 | 0.129 | 0.001 |
| Example 17 | 2.05 | 1.70 | 0.182 | 0.117 | 0.14 | 0.500 | 0.632 | 0.131 | 0.001 |
| Example 18 | 2.08 | 1.83 | 0.162 | 0.112 | 0.13 | 0.448 | 0.657 | 0.126 | 0.001 |
| Example 19 | 2.15 | 1.79 | 0.164 | 0.118 | 0.14 | 0.463 | 0.642 | 0.131 | 0.001 |
| Example 20 | 2.15 | 1.81 | 0.151 | 0.111 | 0.14 | 0.463 | 0.627 | 0.126 | 0.001 |
| Example 21 | 2.21 | 1.82 | 0.148 | 0.107 | 0.14 | 0.463 | 0.627 | 0.121 | 0.002 |
| Example 22 | 2.02 | 1.66 | 0.151 | 0.113 | 0.14 | 0.493 | 0.627 | 0.125 | 0.001 |
| Example 23 | 2.06 | 1.73 | 0.152 | 0.112 | 0.15 | 0.530 | 0.652 | 0.129 | 0.001 |
| Example 24 | 2.86 | 2.25 | 0.195 | 0.118 | 0.18 | 0.543 | 0.700 | 0.143 | 0.001 |
| Example 25 | 2.57 | 2.06 | 0.171 | 0.106 | 0.17 | 0.529 | 0.643 | 0.134 | 0.001 |
| Example 26 | 2.43 | 1.96 | 0.176 | 0.117 | 0.18 | 0.521 | 0.662 | 0.137 | 0.000 |
| Example 27 | 2.12 | 1.76 | 0.186 | 0.117 | 0.16 | 0.507 | 0.597 | 0.142 | 0.001 |
| Example 28 | 2.51 | 2.01 | 0.185 | 0.116 | 0.17 | 0.500 | 0.647 | 0.143 | 0.001 |

TABLE 1-continued

|  | A | B | C | D | E | F | G | H | I |
|---|---|---|---|---|---|---|---|---|---|
| Example 29 | 2.37 | 1.86 | 0.171 | 0.116 | 0.18 | 0.507 | 0.627 | 0.143 | 0.001 |
| Example 30 | 2.19 | 1.75 | 0.171 | 0.115 | 0.13 | 0.347 | 0.639 | 0.129 | 0.000 |
| Example 31 | 2.20 | 1.79 | 0.161 | 0.120 | 0.14 | 0.338 | 0.606 | 0.130 | 0.001 |
| Example 32 | 1.31 | 1.10 | 0.135 | 0.091 | 0.13 | 0.509 | 0.595 | 0.119 | 0.000 |
| Example 33 | 1.37 | 1.00 | 0.125 | 0.103 | 0.11 | 0.614 | 0.667 | 0.104 | 0.000 |

Comparative Examples 1 to 33

Figure 16:
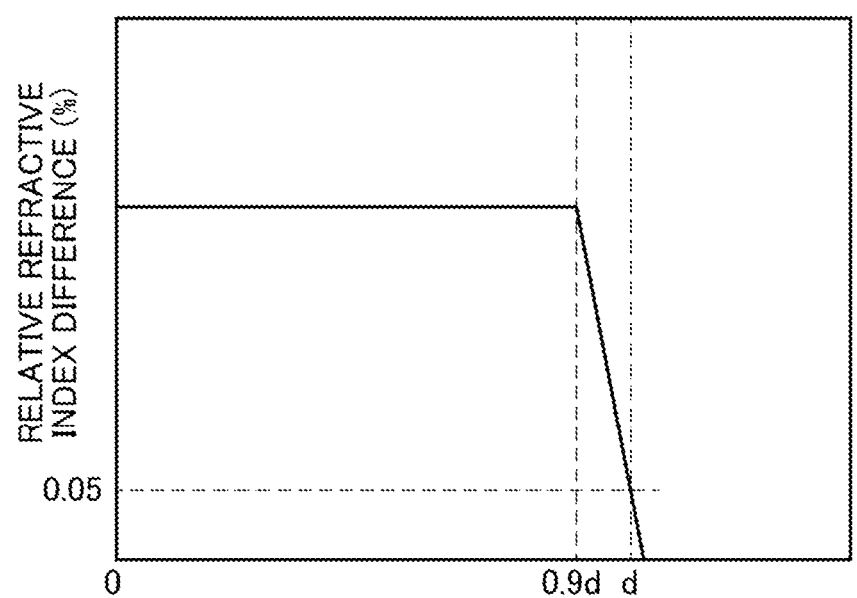
FIG. 16 is a diagram illustrating an example of a refractive index profile of a core of an active element-added optical fiber of a comparative example.

FIG. 16 is a diagram illustrating an example of a refractive index profile of a core of an active element-added optical fiber of a Comparative Example. In each Comparative Example, it is assumed that the relative refractive index difference with respect to the cladding in the region of $0 \leq r \leq 0.9$ d is constant and the relative refractive index difference gradually decreases from r=0.9 d toward the outer peripheral side, and the relative refractive index difference with respect to the cladding is 0.05% in the region of r=d. This means that in the region of $0 \leq r \leq 0.9$ d, the active element is added at a constant concentration, and the concentration of the active element gradually decreases from r=0.9 d toward the outer peripheral side. The relative refractive index difference with respect to the cladding in the region of $0 \leq r \leq 0.9$ d in each Comparative Example was set to be the same as H: the average value of the relative refractive index difference with respect to the inner cladding 12 in the region of $0 \leq r \leq 0.9$ d in the corresponding Example. Therefore, for example, the relative refractive index difference with respect to the cladding in the region of $0 \leq r \leq 0.9$ d in Comparative Example 1 is 0.141(%), which is the same value as H in Example 1. The simulation below was performed under such conditions.

Next, the effective cross-sectional area ($\mu m^2$) of the LP01 mode light in a case where light having a wavelength of 1070 nm propagates through the core of each of the active element-added optical fibers of Examples 1 to 33 and the active element-added optical fibers of Comparative Examples 1 to 33 was obtained by simulation. The results are shown in Table 2.

TABLE 2

|  | Example | Comparative Example |
|---|---|---|
| 1 | 397.2 | 336.2 |
| 2 | 439.2 | 352.7 |
| 3 | 433.1 | 346.8 |
| 4 | 429.9 | 341.7 |
| 5 | 437.5 | 346.0 |
| 6 | 401.5 | 354.2 |
| 7 | 389.5 | 347.5 |
| 8 | 434.9 | 344.2 |
| 9 | 401.6 | 341.2 |
| 10 | 393.6 | 337.8 |
| 11 | 405.9 | 341.9 |
| 12 | 403.9 | 337.8 |
| 13 | 383.0 | 362.3 |
| 14 | 391.4 | 351.8 |
| 15 | 438.8 | 345.0 |
| 16 | 425.2 | 344.2 |
| 17 | 404.5 | 348.3 |
| 18 | 405.0 | 345.0 |
| 19 | 413.0 | 344.2 |
| 20 | 409.8 | 341.8 |
| 21 | 434.0 | 344.4 |
| 22 | 427.2 | 346.8 |
| 23 | 403.2 | 335.2 |
| 24 | 392.8 | 355.5 |
| 25 | 404.9 | 357.7 |
| 26 | 397.2 | 362.5 |
| 27 | 384.5 | 332.9 |
| 28 | 402.3 | 336.9 |
| 29 | 401.7 | 330.2 |
| 30 | 412.7 | 389.4 |
| 31 | 401.6 | 379.8 |
| 32 | 894.6 | 890.8 |
| 33 | 1023.4 | 892.2 |

As shown in Table 2, the effective cross-sectional area of the LP01 mode light in the active element-added optical fibers of Examples 1 to 33 was larger than the effective cross-sectional area of the LP01 mode light in the corresponding active element-added optical fibers of Comparative Examples 1 to 33. This is considered to be because in the active element-added optical fibers of Examples 1 to 33, in the region of 0.2 d<r≤50.9 d, at least one maximum value position at a relative refractive index difference higher than the average value of the relative refractive index difference in the region of $0 \leq r \leq 0.9$ d exists.

Further, in a case where light having a wavelength of 1070 nm propagates through the core of each of the active element-added optical fibers of Examples 1 to 33 and the active element-added optical fibers of Comparative Examples 1 to 33, the beam quality ($M^2$) of light emitted from the active element-added optical fibers was obtained by simulation. The results are shown in Table 3.

TABLE 3

|  | Example | Comparative Example |
|---|---|---|
| 1 | 1.32 | 1.89 |
| 2 | 1.28 | 1.76 |
| 3 | 1.3 | 1.84 |
| 4 | 1.33 | 1.88 |
| 5 | 1.27 | 1.9 |
| 6 | 1.28 | 1.92 |
| 7 | 1.28 | 1.75 |
| 8 | 1.32 | 1.83 |
| 9 | 1.31 | 1.87 |
| 10 | 1.32 | 1.9 |
| 11 | 1.26 | 1.93 |
| 12 | 1.29 | 1.78 |
| 13 | 1.3 | 1.81 |
| 14 | 1.25 | 1.85 |
| 15 | 1.28 | 1.77 |
| 16 | 1.26 | 1.91 |
| 17 | 1.29 | 1.84 |
| 18 | 1.34 | 1.89 |
| 19 | 1.33 | 1.94 |
| 20 | 1.34 | 1.79 |
| 21 | 1.32 | 1.81 |
| 22 | 1.35 | 1.8 |
| 23 | 1.33 | 1.85 |
| 24 | 1.32 | 1.77 |
| 25 | 1.35 | 1.91 |
| 26 | 1.29 | 1.83 |
| 27 | 1.3 | 1.89 |

TABLE 3-continued

| | Example | Comparative Example |
|---|---|---|
| 28 | 1.27 | 1.79 |
| 29 | 1.26 | 1.88 |
| 30 | 1.30 | 1.88 |
| 31 | 1.28 | 1.88 |
| 32 | 1.28 | 2.03 |
| 33 | 1.34 | 2.09 |

As shown in Table 3, the values of the beam quality of the light emitted from the active element-added optical fibers of Examples 1 to 33 were smaller than the values of the beam quality of the light emitted from the corresponding active element-added optical fibers of Comparative Examples 1 to 33. That is, with the active element-added optical fibers of Examples 1 to 30, deterioration of beam quality was suppressed as compared with the corresponding active element-added optical fibers of Comparative Examples 1 to 30.

Note that, in Examples 1 to 33 shown in Tables 1 to 3 in which the active element was ytterbium, the average value of the concentration of ytterbium in the region of 0≤r≤0.1 d was 1.31 wt % or more and 2.86 wt % or less. Further, the average value of the concentration of ytterbium in the region of 0.1 d<r≤ra was 1.00 wt % or more and 2.25 wt % or less. Further, the average value of the relative refractive index difference of the core to the cladding in the region of 0≤r≤0.1 d was 0.125% or more and 0.195% or less. Further, the relative refractive index difference of the core to the cladding in the region of r=0.2 d was 0.091% or more and 0.138% or less. Further, the relative refractive index difference with respect to the cladding at the maximum value position in the region of 0.2 d<r≤0.9 d was 0.11% or more and 0.19% or less. Further, the average value of the relative refractive index difference to the cladding in the region of 0≤r≤0.9 d was 0.104% or more and 0.156% or less. Further, the standard deviation of the relative refractive index difference of the region of 1.1 ra<r≤0.9 d was 0.004 or less.

Next, the relationship between the effective cross-sectional area of light propagating through the core of the active element-added optical fiber in which the maximum value position where the refractive index is maximum exists in the core as described above and the effective cross-sectional area of light propagating through the core of the active element-added optical fiber having a step-type refractive index profile as illustrated in FIG. 16 in which the relative refractive index difference of the core with respect to the cladding is constant was examined by simulation.

Specifically, a plurality of sets of step-type active element-added optical fibers and active element-added optical fibers having a maximum value, in which the relative refractive index difference of one active element-added optical fiber of the step-type active element-added optical fibers is the same as the average value of the relative refractive index difference of one active element-added optical fiber of a plurality of active element-added optical fibers having a maximum value, was subjected to the above simulation. That is, an optical fiber set having a common average value was subjected to the simulation. Note that the common average value in each of the plurality of optical fiber sets is different for each optical fiber set.

In the above simulation, the effective cross-sectional area of each of the step-type active element-added optical fiber and the active element-added optical fiber having the maximum value, which constitute the set described above, was calculated, and the difference between these effective cross-sectional areas was determined. Specifically, Simulation 1 of obtaining a difference in effective cross-sectional area using the active element-added optical fiber having a maximum value formed so that the average value in the region where the distance r from the central axis of the core is 0.055 d or more and 0.1 d or less is equal to or more than the value of the relative refractive index difference at the maximum value position, and Simulation 2 of obtaining a difference in effective cross-sectional area using the active element-added optical fiber having a maximum value formed so that the average value in the region where the distance r is 0 or more and 0.1 d or less is equal to or less than the value of the relative refractive index difference at the maximum value position were performed.

Figure 17:
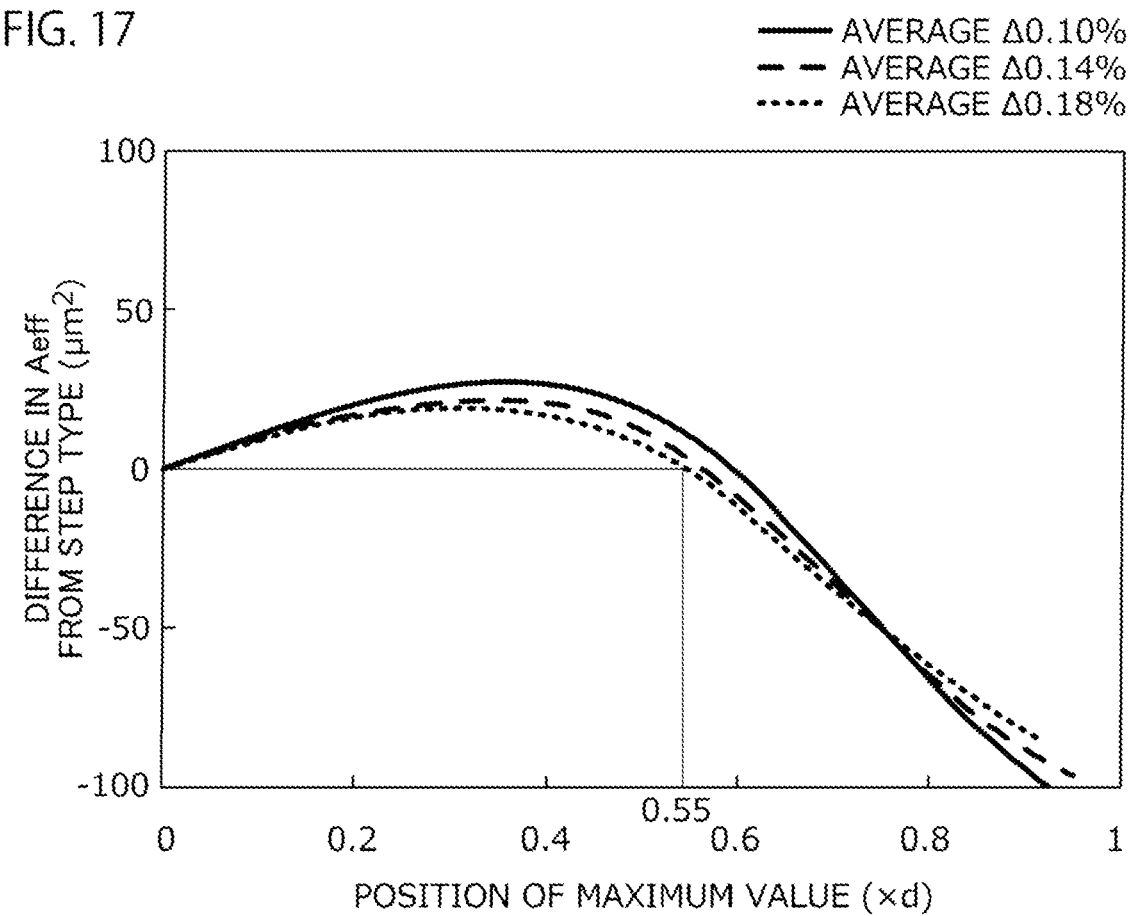
FIG. 17 is a diagram illustrating an example of a relationship between a difference between an effective cross-sectional area of an active element-added optical fiber of one or more embodiments of the present invention and an effective cross-sectional area of a step-type optical fiber and a maximum value position in a core of the active element-added optical fiber of one or more embodiments of the present invention.
Figure 18:
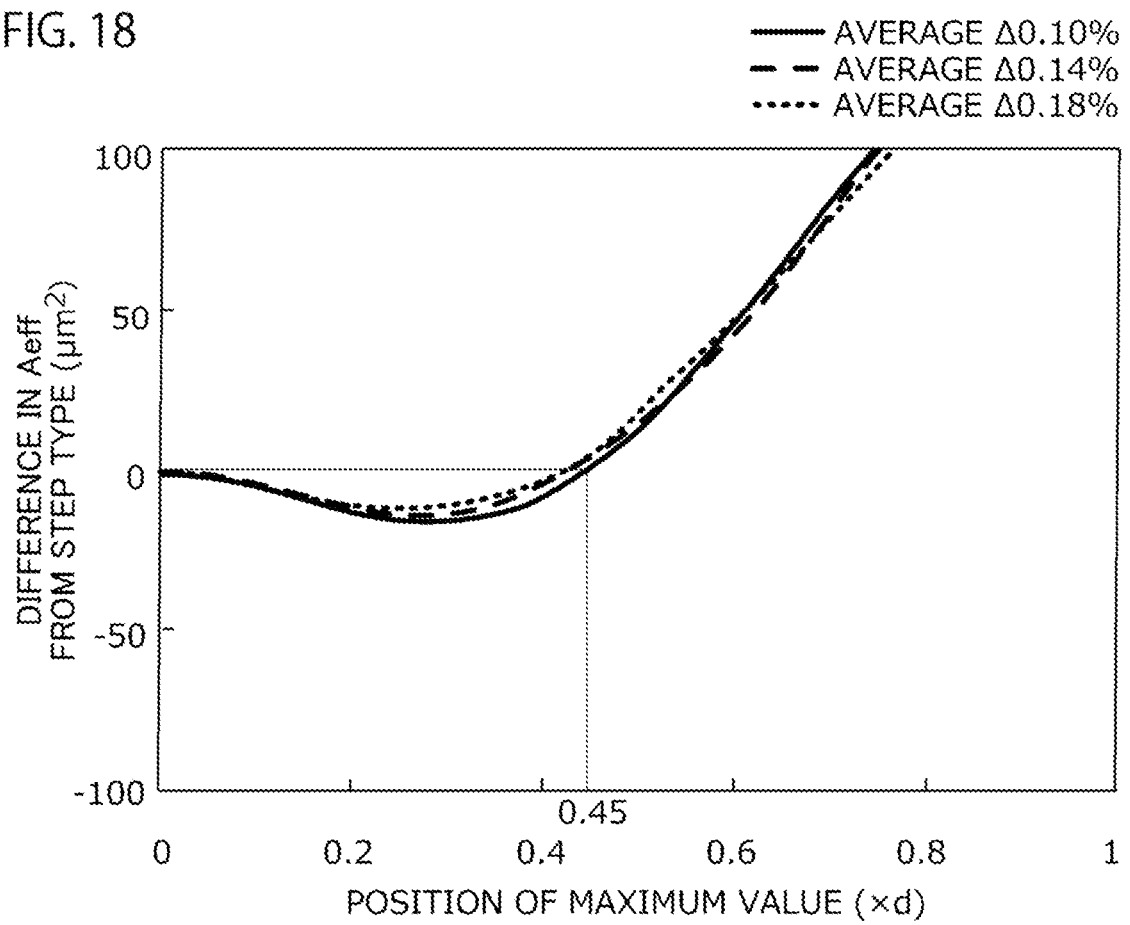
FIG. 18 is a diagram illustrating another example of a relationship between a difference between an effective cross-sectional area of an active element-added optical fiber of one or more embodiments of the present invention and an effective cross-sectional area of a step-type optical fiber and a maximum value position in a core of the active element-added optical fiber of one or more embodiments of the present invention.

The results of Simulation 1 and Simulation 2 are illustrated in FIGS. 17 and 18, respectively. Note that FIGS. 17 and 18 illustrate the relationship between the maximum value position and the difference in effective cross-sectional area when an average value Δ of the relative refractive index difference of the core of the active element-added optical fiber having the maximum value is 0.10%, 0.14%, and 0.18%. Note that, as described above, the average value Δ of the relative refractive index difference of the core of the active element-added optical fiber having the maximum value is equal to the relative refractive index difference of the core of the step-type optical fiber constituting the optical fiber set together with the active element-added optical fiber having the maximum value.

As illustrated in FIG. 17, according to Simulation 1 using the active element-added optical fiber having the maximum value in which the average value of the relative refractive index difference in the region of 0.055 d or more and 0.1 d or less is the maximum value or more, it has been found that when the average value of the relative refractive index difference of the core is larger than 0% and 0.18% or less, when the maximum value position is 0.55 d or less, the effective cross-sectional area is larger than that in the case of the step-type optical fiber having the same relative refractive index difference, which constitutes the optical fiber set. That is, with such an active element-added optical fiber having a maximum value, the effective cross-sectional area is increased, and stimulated Raman scattering can be further suppressed. Note that the case where the average value of the relative refractive index difference of the core is larger than 0% and 0.18% or less is a case where the refractive index of the core is a refractive index that is high enough to guide light, and, for example, the average value of the relative refractive index difference of the core may be 0.05% or more and 0.18% or less.

Further, as illustrated in FIG. 18, according to Simulation 2 using the active element-added optical fiber having the maximum value in which the average value of the relative refractive index difference in the region of 0 or more and 0.1 d or less is the maximum value or less, it has been found that when the average value of the relative refractive index difference of the core is 0.10% or more, when the maximum value position is 0.45 d or more, the effective cross-sectional area is larger than that in the case of the step-type optical fiber having the same relative refractive index difference, which constitutes the optical fiber set. That is, with such an active element-added optical fiber having a maximum value, the effective cross-sectional area is increased, and stimulated Raman scattering can be further suppressed. Note that, in Simulation 2, the upper limit of the average value of the relative refractive index difference that provides the effect of increasing the effective cross-sectional area is not particularly limited as long as the maximum value position is 0.45 d or more, but, for example, the upper limit of the average value of the relative refractive index difference may be set to 0.18%.

As described above, according to one or more embodiments, an active element-added optical fiber, a resonator, and a fiber laser device capable of suppressing deterioration of beam quality are provided, and are expected to be used in a laser device for machining or the like.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

The invention claimed is:

1. An active element-doped optical fiber comprising:
a core that includes a first region and a second region, wherein
the first region ranges from a central axis to a radius of the first region, and is doped with an active element excited by light,
the second region surrounds the first region with no gap, extends to an outer peripheral surface of the core, and is not doped with the active element,
the core satisfies $0.1\ d < ra < d$, where ra is the radius of the first region and d is a radius of the core, and
the core has, in a region of $0.2\ d < r \leq 0.9\ d$, a maximum value position at which a refractive index becomes maximum and higher than an average value of a refractive index in a region of $0 \leq r \leq 0.9\ d$, where r is a distance from a central axis of the core in a radial direction.

2. The active element-doped optical fiber according to claim 1, wherein
an average value of a concentration of the active element in a region of $0 \leq r \leq 0.1\ d$ is higher than an average value of a concentration of the active element in a region of $0.1\ d < r \leq ra$.

3. The active element-doped optical fiber according to claim 1, wherein
an average value of a refractive index in a region of $0.1\ d \leq r \leq 0.8\ ra$ is higher than an average value of a refractive index in a region of $1.1\ ra \leq r \leq 0.9\ d$.

4. The active element-doped optical fiber according to claim 1, wherein
an average value of a refractive index in a region of $0.1\ d \leq r \leq 0.8\ ra$ is lower than an average value of a refractive index in a region of $1.1\ ra \leq r \leq 0.9\ d$.

5. The active element-doped optical fiber according to claim 1, wherein
an average value of a refractive index in a region of $0.1\ d \leq r \leq 0.8\ ra$ is equal to an average value of a refractive index in a region of $1.1\ ra \leq r \leq 0.9\ d$.

6. The active element-doped optical fiber according to claim 1, wherein
the core satisfies $ra \leq 0.75\ d$.

7. The active element-doped optical fiber according to claim 6, wherein
the core satisfies $ra \leq 0.7\ d$.

8. The active element-doped optical fiber according to claim 7, wherein
the core satisfies $ra < 0.7\ d$.

9. The active element-doped optical fiber according to claim 1, wherein
the core satisfies $0.4\ d < ra$.

10. The active element-doped optical fiber according to claim 9, wherein
the core satisfies $0.5\ d < ra$.

11. The active element-doped optical fiber according to claim 1, wherein
an average value of a refractive index in a region of $0 \leq r \leq 0.1\ d$ is higher than a refractive index in a region of $r = 0.2\ d$.

12. The active element-doped optical fiber according to claim 1, wherein
the active element includes ytterbium.

13. The active element-doped optical fiber according to claim 12, wherein
the core has the maximum value position in a region of $0.338\ d \leq r \leq 0.614\ d$.

14. The active element-doped optical fiber according to claim 12, wherein
the core satisfies $0.595\ d \leq ra \leq 0.716\ d$.

15. The active element-doped optical fiber according to claim 1, wherein
the core has a region of $1.1\ ra < r \leq 0.9\ d$ in which a standard deviation of a relative refractive index difference is equal to or less than 0.004.

16. The active element-doped optical fiber according to claim 15, wherein
at least the region of $1.1\ ra < r \leq 0.9\ d$ is made of quartz with which only germanium is doped.

17. The active element-doped optical fiber according to claim 1, wherein
the maximum value position locates in the first region,
at least a part of the first region is further doped with an up-dopant that increases a refractive index of the core, and
a concentration of the up-dopant becomes maximum at the maximum value position.

18. The active element-doped optical fiber according to claim 1, wherein
the maximum value position locates in the first region,
at least a part of the first region is further doped with a down-dopant that reduces a refractive index of the core, and
a concentration of the down-dopant becomes minimum at the maximum value position.

19. The active element-doped optical fiber according to claim 1, wherein
the maximum value position locates in the first region,
at least a part of the first region is further doped with an up-dopant that increases a refractive index of the core and a down-dopant that reduces the refractive index of the core, and
a concentration difference between the up-dopant and the down-dopant becomes maximum at the maximum value position.

20. The active element-doped optical fiber according to claim 1, further comprising:
a cladding that surrounds an outer peripheral surface of the core with no gap, wherein
an average value of a relative refractive index difference with respect to the cladding in a region of $0 \leq r \leq 0.1\ d$ is equal to or less than a value of a relative refractive index difference at the maximum value position,
an average value of a relative refractive index difference of the core with respect to the cladding is equal to or more than 0.10%, and
the maximum value position is at the distance of $0.45\ d$ or more.

21. The active element-doped optical fiber according to claim 1, further comprising:

a cladding that surrounds an outer peripheral surface of the core with no gap, wherein an average value of a relative refractive index difference with respect to the cladding in a region of 0.055 d≤r≤0.1 d is equal to or more than a value of a relative refractive index difference at the maximum value position, an average value of a relative refractive index difference of the core with respect to the cladding is larger than 0% and equal to or less than 0.18%, and the maximum value position is at the distance of 0.55 d or less.

22. The active element-doped optical fiber according to claim 1, wherein the core has a refractive index profile in which a refractive index gradually decreases from the maximum value position toward an inner side of the core.

23. A resonator comprising:

the active element-doped optical fiber according to claim 1;

a first mirror that is optically coupled to the core of the active element-doped optical fiber on one side of the active element-doped optical fiber, and reflects light having at least a part of wavelength of light emitted by the excited active element; and a second mirror that is optically coupled to the core of the active element-doped optical fiber on another side of the active element-doped optical fiber, and reflects light having at least a part of wavelength of the light reflected by the first mirror at a reflectance lower than a reflectance of the first mirror.

24. A fiber laser device comprising:

the active element-doped optical fiber according to claim 1; and a light source that emits the light exciting the active element.

* * * * *